United States Patent
Moseley et al.

[11] Patent Number: 5,993,004
[45] Date of Patent: Nov. 30, 1999

[54] DISPLAY

[75] Inventors: Richard Robert Moseley, Bourton-on-the-Water; Graham John Woodgate, Henley-on-Thames, both of United Kingdom

[73] Assignee: Sharp Kabushiki Kaisha, Osaka, Japan

[21] Appl. No.: 08/932,264

[22] Filed: Sep. 17, 1997

[30] Foreign Application Priority Data

Sep. 19, 1996 [GB] United Kingdom .................. 9619521

[51] Int. Cl.⁶ .................................................. G03B 21/14
[52] U.S. Cl. .............................. 353/8; 353/20; 359/464
[58] Field of Search .............................. 353/7, 8, 20, 31; 349/5, 7, 9, 15, 18, 95, 96–103, 112; 359/464, 465; 348/57, 58, 59

[56] References Cited

U.S. PATENT DOCUMENTS

| | | | |
|---|---|---|---|
| 5,096,520 | 3/1992 | Faris | 359/37 |
| 5,121,983 | 6/1992 | Lee | 353/8 |
| 5,264,964 | 11/1993 | Faris | 359/465 |
| 5,287,130 | 2/1994 | Umeda | 353/8 |
| 5,355,187 | 10/1994 | Ogino et al. | 353/38 |
| 5,467,206 | 11/1995 | Loiseaux et al. | 353/34 |
| 5,486,884 | 1/1996 | DeVaan | 353/20 |
| 5,537,144 | 7/1996 | Faris | 353/8 |
| 5,566,367 | 10/1996 | Mitsutake et al. | 359/497 |
| 5,583,669 | 12/1996 | Fushimi et al. | 349/5 |
| 5,650,873 | 7/1997 | Gal et al. | 359/487 |
| 5,751,480 | 5/1998 | Kitagishi | 359/485 |

FOREIGN PATENT DOCUMENTS

| | | |
|---|---|---|
| 0653891 | 5/1995 | European Pat. Off. . |
| 0721132 | 7/1996 | European Pat. Off. . |
| 0724176 | 7/1996 | European Pat. Off. . |
| 2296099 | 6/1996 | United Kingdom . |
| 2296151 | 6/1996 | United Kingdom . |

*Primary Examiner*—William Dowling

[57] ABSTRACT

A stereoscopic 3D display comprises a light source and condenser optics which direct light through a spatial light modulator and a polarisation modulator. Each of the modulators is pixellated with the pixels of one modulator being optically aligned with respective pixels of the other modulator. Each pixel of the spatial light modulator is controlled so as to provide a light amplitude which is equal to the square root of the sum of the squares of the corresponding pixels of the stereoscopic images. Each pixel of the polarisation modulator is controlled so as to supply output light with a polarisation angle give by the arc-tangent of the quotient of the pixel amplitudes of the stereoscopic images. Polarising glasses with suitably aligned polariser lenses allow an observer to perceive the 3D effect, for instance on a polarisation preserving screen on which the encoded stereoscopic image is projected by projection optics.

37 Claims, 20 Drawing Sheets

Possible mixed 2D/3D layout of image screen

DISPLAY

The present invention relates to a display. Such a display may, for instance, be used as a three dimensional (3D) stereoscopic projection display.

GB 2 296 151-discloses an autostereoscopic display with first and second distinct light sources. The first and second light sources emit light having different, generally linear and orthogonal, polarisations. The SLM includes an array of polarising elements arranged as first and second sets which alternate with each other to form a micropolariser in which the elements of the first set pass light from the first light source whereas the elements of the second set pass light from the second light source. An optical system images the light from the sources through the SLM to form left eye and right eye viewing zones. The pixels of the SLM associated with the first and second sets of polarising elements display stereoscopic 2D Images which can be viewed autostereoscopically when the left and right eyes of an observer are located in the respective viewing zones.

A known stereoscopic 3D projection display is shown in FIG. 1 of the accompanying drawings and essentially comprises two projection systems which project stereoscopic views with orthogonal polarisations onto a polarisation preserving screen 1. The projection systems comprise light sources 2 and 3 associated with condenser optics 4 and 5 for illuminating image sources 6 and 7, such as liquid crystal spatial light modulators Projection optics 8 and 9 project the images through polarisation elements 10 and 11 illustrated as having orthogonal linear polarisation states 12 and 13. The images formed on the screen I are viewed through passive polarising glasses having orthogonal polarisation states which, in use, are aligned with the polarisation states 12 and 13 so that the left eye of an observer sees substantially only light from the left eye image and the right eye of the observer sees substantially only light from the right eye image.

The system illustrated in FIG. 1 requires two separate projection systems including relatively expensive projection optics 8 and 9. The system is therefore relatively expensive and of large size. Also, very careful alignment is required in order to ensure correct registration between the left and right eye images at the screen 1, down to an individual pixel level. Furthermore, having two physically separate projection lens systems can give some keystone distortions between the projected images on the screen. If the images are not correctly aligned, the observer will experience the symptoms of visual strain, for example, headaches and eye fatigue.

FIG. 2 of the accompanying drawings illustrates another system which allows a single set of projection optics 14 to be used. The light sources, condensing optics and image sources are still required to be duplicated as illustrated diagrammatically at 15 and 16 together with means for ensuring that the output light from the two sets of devices is orthogonally polarised. However, light from the two subsystems is combined in a beam combiner 17 so that the single projection optics 14 may be used. The beam combiner 17 may, for instance, comprise a polarising cube. However, there is still considerable duplication of components and the problem of registration of the two images remains. A further disadvantage is the cost of the beam combiner 17.

The system of FIG. 2 may be modified so as to use a single light source and a beam splitter, such as a second polarising cube, for splitting the polarisation components from the light source. Although this improves the efficiency of light usage, the system is still relatively expensive and bulky.

FIG. 3 of the accompanying drawings shows another known stereoscopic 3D projection display based on the use of a cathode ray tube (CRT) 20. The CRT 20 is associated with a projection lens 21 which projects the images displayed by the CRT through a polariser 22, a switching polarisation element in the form of a switching pi-cell 23, and a quarter wave retarder 24 onto a polarisation preserving screen 1. The or each observer wears a pair of polarising glasses 25 comprising quarter wave retarders 26 and 27 and orthogonally arranged linear polarisers 28 and 29.

In use, the CRT 20 displays left and right eye views alternately. Light form the CRT is linearly polarised by the polariser 22 and passes through the switching pi-cell 23 which alternately passes the light without changing the direction of polarisation and rotates the direction of polarisation by 90° in synchronism with the left and right eye images. The output light from the Pi-cell 23 is then converted to circular polarisation of opposite handedness by the retarder 24. The retarders 26 and 27 convert the light back to linear polarisation and the polarisers 28 and 29 pass orthogonal polarisations so that the left eye of the observer sees substantially only the left eye image and the right eye of the observer sees substantially only the right eye Image.

This system requires that the CRT 20 is refreshed at twice the normal video frame rate which precludes the substitution of relatively slow image sources for the CRT 20, such as many types of liquid crystal displays (LCDS). When the CRT 20 is used as the image source, the persistence of the phosphor screen delays the extinction of each image so that cross-talk between stereoscopic views can occur. Further, the system relies on the abilities of the pi-cell 23 to switch rapidly and accurately between the states providing zero polarisation rotation and 90° polarisation rotation in order to minimise cross-talk.

FIG. 4 of the accompanying drawings illustrates a micropolariser stereoscopic 3D projection display of the type disclosed by Sadeg MA Faris, "Novel 3D Stereoscopic Imaging Technology", SPIE Vol. 2177 Stereoscopic Displays and Virtual Reality Systems (1994). The display comprises a single light source 2, a single set of condenser optics 4, and a single set of projection optics 8. The image display device comprises a spatial light modulator (SLM) 30 which displays the right and left eye images in a spatially multiplexed format In particular, alternate picture elements (pixels) display the left eye image and supply light with a first polarisation as shown at 31 whereas the remaining pixels simultaneously display the right eye image and supply light with the orthogonal polarisation as illustrated at 32. The image may then be viewed stereoscopically via suitable polarising glasses.

A disadvantage of this system is that each image is displayed with half the resolution of which the SLM 30 is capable. However, the system is capable of displaying 2D images with full resolution, for which the observer does not wear polarising glasses.

According to the invention, there is provided a display characterized by comprising a pixellated display device and a pixellated polarisation modulator, each of whose pixels is optically aligned with a respective pixel of the display device.

The polarization modulator may comprise a variable polarisation rotator, each of whose pixels is controllable so as to vary the output linear polarisation angle over a range of at least substantially 90°.

The polarisation modulator may comprise a variable polarisation retarder, each of whose pixels is controllable so as to vary the retardance over a range of at least substantially 180° phase delay between the fast and slow optical axes.

The polarisation modulator may comprise a pixellated time sequential polarisation switcher, each of whose pixels is switchable between a first state for providing a first output polarisation and a second state for providing a second output polarisation substantially perpendicular to the first polarisation.

The polarisation modulator may comprise a first liquid crystal device, The first liquid crystal device may comprise a first liquid crystal layer and at least one pixellated electrode.

The first liquid crystal layer may comprise a twisted nematic liquid crystal

The first liquid crystal layer may comprise a ferroelectric liquid crystal.

The first liquid crystal device may comprise a pi-cell.

The first liquid crystal device may comprise a pi-cell and an output quarter waveplate The display may comprise a first microlens array disposed on an input side of the polarisation modulator and comprising a plurality of microlenses, each of which Is optically aligned with a respective pixel of the polarisation modulator.

The display may comprise a first Fresnel lens disposed on an input side of the polarisation modulator.

The display may comprise a second microlens array disposed on an output side of the polarisation modulator and comprising a plurality of microlenses, each of which is optically aligned with a respective pixel of the polarisation modulator.

The display may comprise a second Fresnel lens disposed on an output side of the polarisation modulator.

The display may comprise a third microlens array disposed on an output side of the display device and comprising a plurality of microlenses, each of which is optically aligned with a respective pixel of the display device The display may comprise a third Fresnel lens disposed on an output side of the display device.

The display may comprise a fourth Fresnel lens disposed on an input side of the display device.

The display device may comprise a pixellated spatial light modulator and a light source.

The display may comprise a fourth microlens array disposed on an Input side of the spatial light modulator and comprising a plurality of microlenses, each of which is optically aligned with a respective pixel of the spatial light modulator.

The spatial light modulator may comprise a second liquid crystal device

The spatial light modulator may comprise a deformable mirror array.

The second liquid crystal de vice may comprise a second liquid crystal layer and a polariser disposed between the first and second liquid crystal layers. The first liquid crystal layer may be disposed between first and second substrates and the second liquid crystal layer may be disposed between the second substrate and a third substrate. The first and second liquid crystal layers may be disposed between a pair of substrates. The display may comprise an optical system for imaging the display device on the polarisation modulator such that each pixel of the display device is imaged onto a respective pixel of the polarisation modulator.

The display device may comprise a light imaging device. The light imaging device may comprise a cathode ray tube. The display may comprise a fibre optic face plate.

The display may comprise a polarisation preserving diffuser,

The display may comprise a projection optical system and a polarisation preserving screen.

The display may comprise a quarter waveplate disposed at an output side of the polarisation modulator.

The display may comprise a controller for controlling each pixel of the display device to produce a light amplitude of rim $\sqrt{(A_1^2+A_2^2)}$ and for controlling each pixel of the polarisation modulator to produce a polarisation angle of $\tan^{-1}(A_1/A_2)$, where $A_1$ and $A_2$ are the corresponding pixel amplitudes of first and second images, respectively. The display may be provided for stereoscopic viewing and may comprise a pair of viewing glasses having orthogonally polarised lenses.

The display may be provided for stereoscopic viewing and may comprise a pair of viewing glasses comprising first and second polarisers whose polarising directions are substantially parallel and first and second half waveplates whose optical axes are at plus and minus a predetermined angle with respect to the polarising directions. The predetermined angle may be substantially 22.5°.

The display may be provided for autostereoscopic viewing and may comprise first and second orthogonally polarised light sources, the display comprising a spatial light modulator, and the polarisation modulator being disposed between the light sources and the spatial light modulator.

It is thus possible to provide displays for 3D viewing which have a single optical path requiring fewer optical elements and allowing a more compact layout to be provided. Relatively expensive beam combining elements, which can give rise to colour and intensity mismatching between stereoscopic images, are eliminated and automatic and exact alignment between the two stereoscopic views can be achieved. Two full resolution full colour views can be provided in the 3D mode of operation and, when used partially or fully in a 2D mode, a full resolution full colour image can be provided. Such displays can provide a mixture of such images simultaneously with areas of 3D Information reconfigurable at will.

Standard video rate devices may be used because the displays may be operated at the standard video frame rate. The display device and the polarisation modulator may be embodied using standard commercial components with little or no modification and are; therefore, inexpensive to manufacture. In particular, the devices are compatible with LCD technology. The optical efficiency is equal to that of the more efficient known displays, for instance described hereinbefore.

The invention will be further described, by way of example, with reference to the accompanying drawings, in which.

Like reference numerals refer to like parts throughout the drawings.

Figure 4:
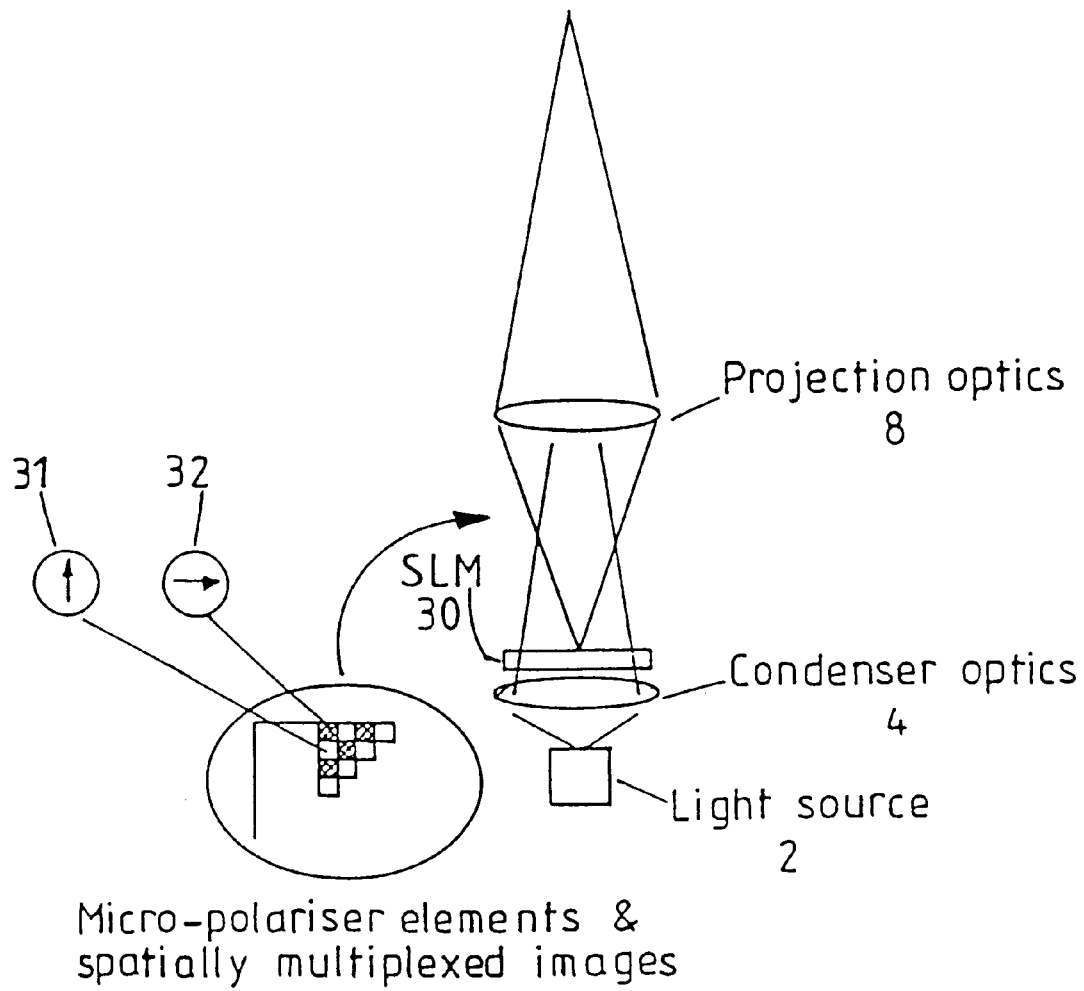
Figure 5:
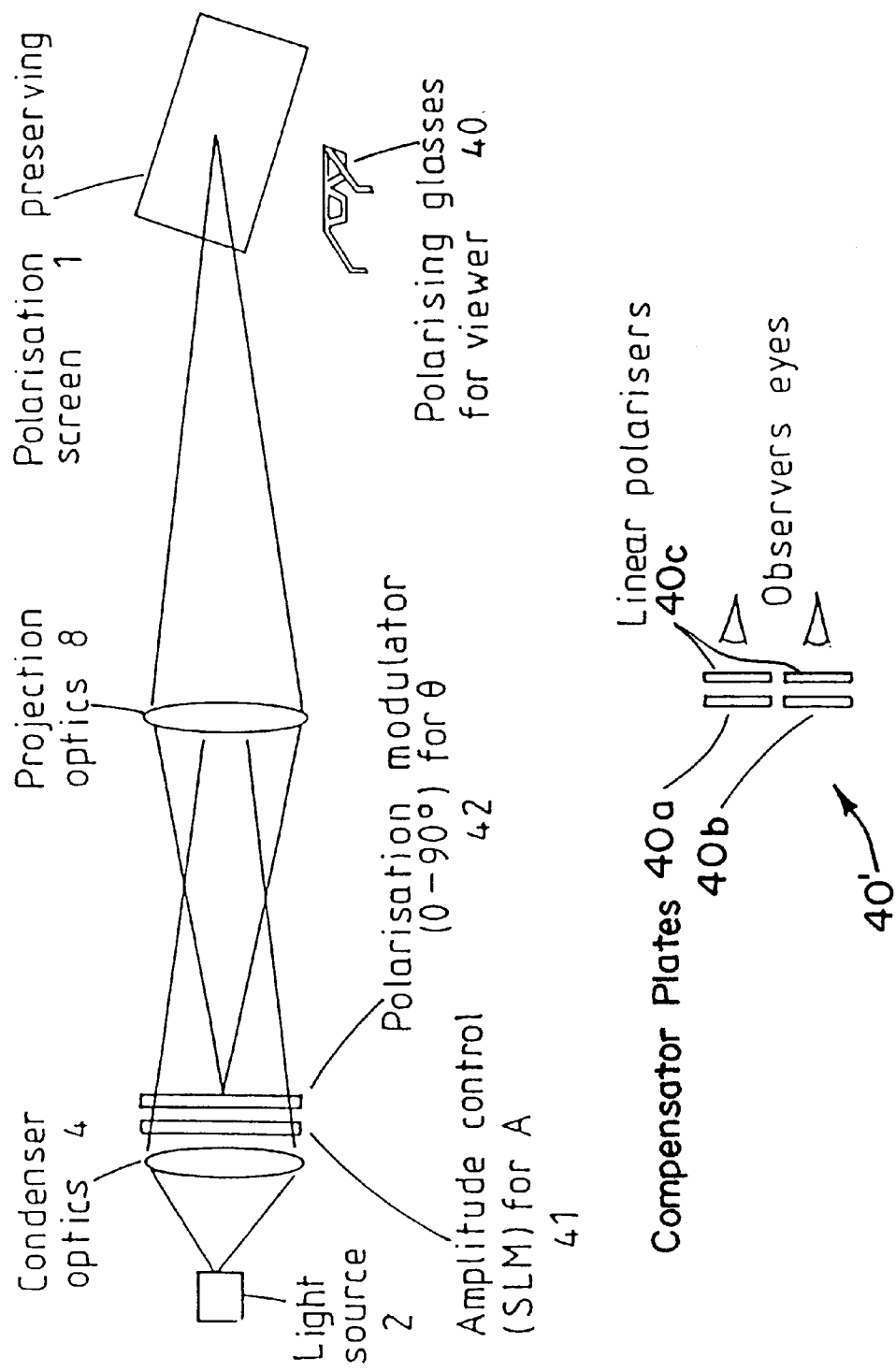
FIG. 5 is a diagram showing a stereoscopic 3D projection display constituting an embodiment of the invention.

The stereoscopic 3D projection display shown in FIG. 5 comprises a single light source 2, a single set of condenser optics 4, and a single set of projection optics 8 for projecting the stereoscopic images onto a polarisation preserving screen 1 for viewing by polarising glasses 40. The display of FIG. 5 differs from that shown in FIG. 4 in that the SLM 30 is replaced by an SLM 41 for providing light amplitude control and a polarization modulator 42 for controlling the angle of polarisation of output light. The SLM 41 and the polarisation modulator 42 are pixellated such that each pixel of the modulator 42 is optically aligned with a respective pixel of the SLM 41. Each pixel of the SLM 41 is controlled so as to supply amplitude A which is equal to $\sqrt{A_L^2 + A_R^2}$, where $A_L$ and $A_R$ are the desired light amplitudes of the corresponding pixels of the left and right stereoscopic images, respectively. The corresponding pixel of the modulator 42 is controllable so as to vary the output linear polarisation of light from the corresponding SLM pixel over a range of 9° such that the angle θ of the polarisation direction is given by $\tan^{-1}(A_L/A_R)$.

When an observer views the resultant pixel projected onto the screen 1 through the polarising glasses 40, the polarisers of the glasses analyse the Intensity and polarisation such that the left eye sees the desired amplitude $A_L$ and the right eye sees the desired amplitude $A_R$. The polarisation directions of the polarisers of the glasses 40 are orthogonal and are aligned with the zero and 90° directions of polarisation which may be produced by the modulator 42. Thus, the pixels of the left and right eye images are encoded by the amplitude A and the polarisation direction θ and the original pixel amplitudes $A_L$ and $A_R$ are decoded by the glasses 40.

The SLM 41 may be embodied by any device capable of providing the desired spatial resolution and of operating at the normal video frame rate. For instance, the SLM 41 may comprise a thin film transistor twisted nematic LCD or any other suitable type of LCD. An advantage of the use of an LCD is that the output light is already linearly polarised with a defined axis. Colour filters may be used in the device so as to provide a full colour display. No alteration of a standard LCD panel for a projector system is required.

In order to provide good quality 3D images for stereoscopic viewing, the polarisation modulator 42 should preferably satisfy several requirement. The two orthogonal output states of polarisation, for instance corresponding to 0° and 90° of rotation, should be balanced in their quality and both should exhibit high polarisation ratios. The polarisation ratio is the amplitude of linear polarization in the desired direction divided by the amplitude of linear polarisation in the orthogonal direction. Further, the polarisation modulator 42 should be effective over a wide range of wavelengths of incident light, particularly in the case of colour displays.

The polarisation modulator 42 may operate as a variable pixellated polarisation rotator element. In this mode, linearly polarised light of a defined axis is incident on each pixel and the polarisation axis is rotated by the element through an angle of between zero and 90°. Such a rotator element may be embodied by an LCD, for instance of the twisted nematic (TN) type but having the usual input and output polarisers removed. In this case, the liquid crystal device operates in a light guiding mode. At low applied electric fields, polarisation is rotated by 90° whereas, at high applied electric fields, there is no polarisation rotation. By varying the applied field, intermediate polarisation rotations may be provided. This type of polarisation modulator has the advantage that no additional polarisation controlling optical elements are required. p In a TN type of polarisation modulator, in the absence of an applied field, the liquid crystal director is aligned In the plane of the device but rotates through 90° over the thickness of the liquid crystal layer. As mentioned hereinbefore, this has the effect of rotating an input linear polarisation through 90° by the changing birefringent conditions encountered by light during propagation through the liquid crystal. This effect is of a fairly broadband nature but, because of the different birefringent conditions encountered at different wavelengths and because of the different retardance criteria for different wavelengths, it is not entirely uniform and achromatic. Thus, the output polarisation ratio is not as high as for the input polarisation to such a device. This results in some crosstalk between the left eye and right eye images which may be perceptible to the observer and which may, therefore, degrade the stereoscopic experience and produce uncomfortable viewing. Also, the contrast of the image may be reduced because some light may leak through a polarising lens of the glasses 40 to contaminate low light levels from pixels which are intended to be dark or black. Because of different polarisation conditions experienced by different transmitted light wavelengths, such light leakage may be coloured.

Furthermore, conditions for left eye and right eye images perceived by an observer are not identical. The polarisation output state produced by the switched state, ie: 0° of polarisation rotation, of a TN polarisation modulator 42 is of better polarisation ratio over a wider range of wavelengths than for the unswitched state producing 90° of polarization rotation. This is because, in the switched state when a high electric field is applied across the liquid crystal, the liquid crystal director is switched so as to be substantially orthogonal to the plane of the device and hence parallel to the direction of light propagation through the liquid crystal. The light, therefore, experiences very low birefringence levels and consequently there is relatively very little change in Its polarisation state. Thus, the contrast in light transmission between the two polarisers in the glasses 40 is very good and low crosstalk levels are produced.

Another type of polarisation rotator element comprises the combination of a polarisation retarder and a quarter waveplate. For instance, a pi-cell LCD is suitable for use as the rotator because of its birefringence, as opposed to light guiding, properties and fast relaxation time which enables accurate switching to minimise display cross-talk. Each of the pixels of the polarization retarder is controllable so as to vary the retardance over a range of at least 180° phase delay between the fast and slow optical axes. A quarter waveplate is disposed on the outside of the element. For a colour display, the quarter waveplate Is required to be tuned to the wavelength of Incident light so as to provide a desired performance. This may be achieved by using a pixellated quarter waveplate with each pixel being tuned to the colour of the corresponding colour filter associated with the corresponding pixel of the SLM 41. Alternatively, broadband waveplates can be used such as multi-layer waveplates using, for example, reactive mesogen materials.

Alternatively, the polarisation modulator 42 may be embodied as a controllable birefringence device or polarisation retarder. In such an element, the input linear polarisation is divided into two orthogonal axes, one of which suffers a variable phase delay relative to the other. The polarisation state of the output light is thus controllable between linear in a first direction, elliptical with the major axis in the first direction, circular, elliptical with the major axis perpendicular to the first direction, and linear and perpendicular to the first direction. Such a polarisation retarder element may also be embodied via a liquid crystal device. For example, a pi-cell liquid crystal device may be used for this purpose.

In a further alternative, the polarisation modulator 42 may be embodied as a ferroelectric time-sequential polarisation switcher. A ferroelectric liquid crystal device (FLCD) is capable of very rapid switching between a first state for supplying light of a first polarisation and a second state for supplying light of a second polarisation which may be orthogonal to the first polarisation. It is therefore possible within each video frame to give the impression of an intermediate polarisation state by operating the FLCD in the first state for a fraction of the frame and in the orthogonal state for the remainder of the frame. A variable intermediate state may be provided by varying the fraction of the video frame during which each pixel is in the first state. An observer is not capable of resolving this switching between states and thus perceives a steady light intensity for each eye with the relative intensities being related to the relative time periods in the two states.

The production of two balanced high quality polarisation states is substantially dependent on the liquid crystal configuration employed and on the nature of the glasses 40 worn by the observer. For Instance, as compared with "out-of-plane" liquid crystal devices such as TN devices, improvements in balance may be obtained by making use of "in-plane" liquid crystal devices as the polarisation modulator 42. In such devices, the liquid crystal director is switched between two orientations, both of which are in the plane of the devices The liquid crystal, therefore, operates as a variable birefringence device with the optic axis changing with the director orientation. Good balance between polarisation states may be obtained, for instance, by the use of a device in which the liquid crystal director is switched between angles of +22.5° and −22.5° with respect to the input polarisation orientation and with the thickness of the liquid crystal being selected to provide half waveplate operation. Examples of in-plane liquid crystal devices suitable for use as the polarisation modulator 42 include pi-cells and ferroelectric and antiferroelectrIc liquid crystal devices as mentioned hereinbefore.

A display using such an in-plane liquid crystal device as the polarisation modulator 42 has the same structure as illustrated in FIG. 5. However, in order to Improve the performance, it is possible to modify the glasses 40 so as to include at lease one static compensatory birefingent plate to introduce equal and opposite birefringent conditions to the polarisation modulator in order to improve uniformity. In fact, it is preferable to provide conditions in the light paths to both eyes of the observer such that the combination of all birefringent elements gives a zero overall birefringence when extinction of light is desired. Such an arrangement provides good performance over a wide bandwidth with good polarisation quality. FIG. 5 Illustrates at 40' observer glasses comprising compensator plates 40a and 40b and linear polarisers 40c. Such glasses are intended for use with a system in which the polarisation modulator 42 comprises an in-plane switching device which provides half waveplate operation and whose optical axis is switchable between +22.50 and −22.5° with respect to the direction of polarisation of light from the SLM 41 for providing light intended for the left eye only and the right eye only, respectively. The compensator plates 40a are 40b are arranged to provide half waveplate operation with the optical axis of the left eye compensator plate 40b being aligned at +67.5° and the optical axis of the compensator plate 40a for the right eye being aligned at −67.5° with respect to the direction of input polarisation of light to the modulator 42 when the glasses 40' are horizontal. ie: with the normal orientation when the observer is viewing the display. The linear polarisers 40c are aligned so as to pass light having a linear polarisation at 90° with respect to the input polarisation of light to the modulator 42.

When a pixel of the SLM 41 is producing light intended for the left eye only of the observer, the corresponding pixel of the polarisation modulator 42 is switched such that its optical axis is at +22.50°. The modulator 42, therefore, acts as a half waveplate and the light leaving the pixel of the modulator 42 is polarised in a direction at +45°. When this light passes through the left eye compensator plate 40b whose optic axis is aligned at +67.5+, the polarisation vector is rotated so as to be at 90° so that the light is passed by the left eye linear polariser 40c. However, when the light from the polarisation modulator pixel passes through the right eye compensator plate 40a, its polarisation is rotated to 180°, which is equivalent to 0°, so that the light is substantially extinguished by the right eye polariser 40c.

When a pixel of the SLM 41 produces light intended for the right eye only of the observer, the optical axis of the corresponding pixel of the modulator 42 is switched to +22.5° so that the polarisation vector of light leaving the is pixel is oriented at −45°. The light incident on the left eye compensator plate has its polarisation vector rotated to 180° so that the left eye linear polariser 40c substantially extinguishes the light. The light incident on the right eye compensator plate 40a has its polarisation vector rotated to −90° and is passed by the right eye polariser 40c.

Such an arrangement provides good balance in quality between the two orthogonal output states of polarisation with high polarisation ratios. Also, the conditions In the light paths through the display and the glasses to both eyes of the observer are such that the combinations of the birefringent elements give zero overall birefringence when extinction of light is desired. The achromaticity may be further improved by using multilayer waveplates, for instance for the compensator plates 40a and 40b, which have improved achromatic performance.

Although the optical properties of LCDs vary with viewing angle, this does not give rise to problems in a display of type shown in FIG. 5. In particular, because of the use of collimated light through the devices, the effects of variable optical properties with viewing angle are substantially avoided.

Figure 6:
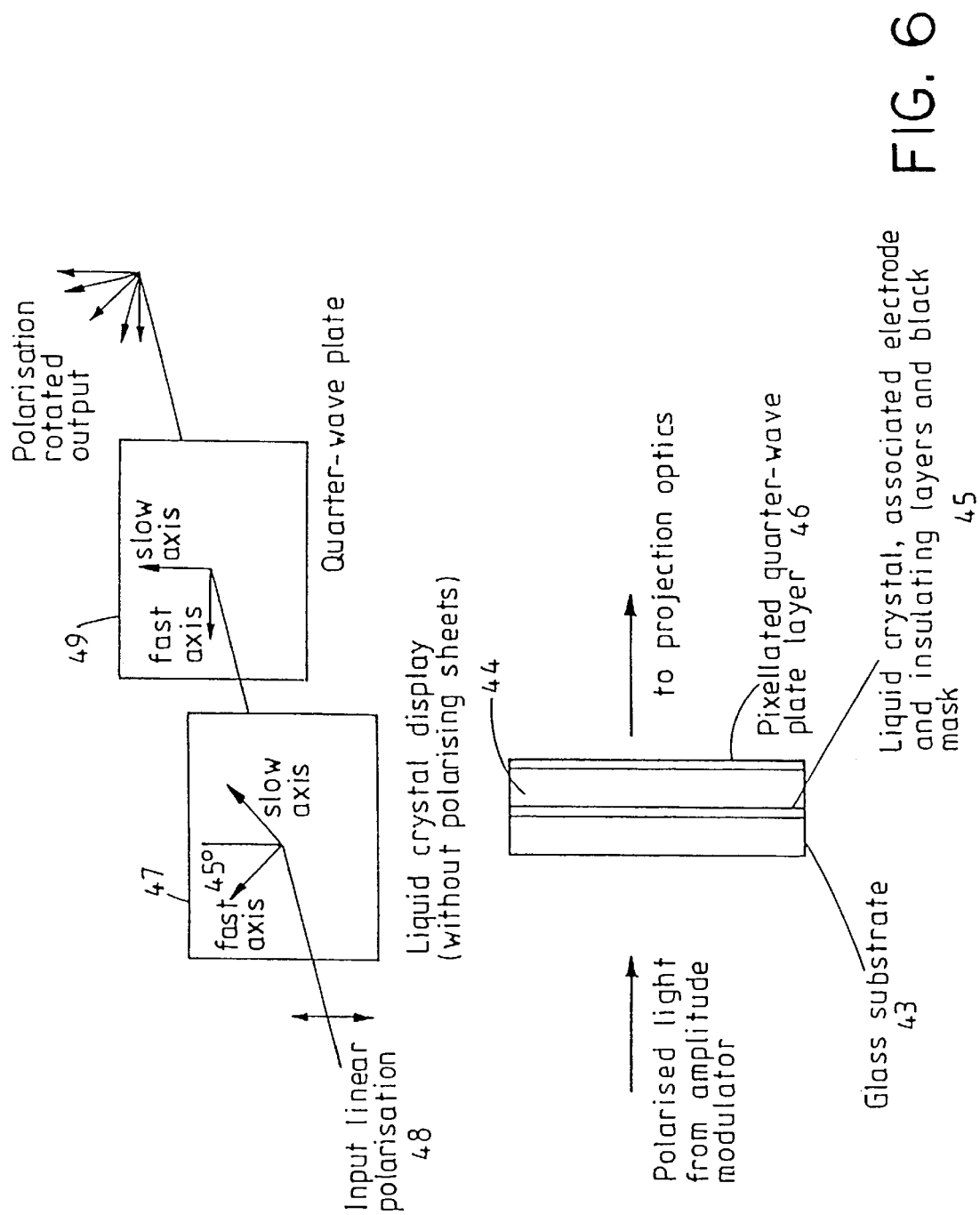
FIGS. 6 to 9 illustrate the construction of devices for use in the display of FIG. 5.

FIG. 6 illustrates one form of the polarisation modulator 42 of the retarder/quarter waveplate type, the lower part of the figure showing the construction and the upper part illustrating the alignment of various optical axes. The rotator comprises glass substrates 43 and 44 between which are disposed a liquid crystal layer, associated electrode and insulating layers and a black mask 45. A pixellated quarter waveplate layer 46 is formed on the output side of the substrate 44. The fast and slow axes of the liquid crystal layer are shown at 47 with respect to the direction of linear polarisation 48 of the input light. The fast and slow axes of the quarter waveplate formed by the layer 46 are shown at 49 in relation to the axes 47.

In order to maximise the efficiency of light utilisation of the display, as much of the light passing through each pixel of the SLM 41 as possible should also pass through the corresponding pixel of the modulator 42. However, light from each pixel of the SLM 41 should not pass through other pixels of the modulator 42 for correct stereo image generation; otherwise, visual artefacts may be seen in the images. This requires good collimation of the incident light. Further, the SLM 41 and the modulator 42 should be disposed close together and in good registration. Because the SLM 41 and the modulator 42 are likely to have black mask elements for restricting the pixel apertures, the good collimation of the input light helps to reduce light loss between the two pixel planes.

A typical known LCD panel for a single panel colour projector has approximately square pixels whose edge dimensions are approximately 50 micrometers with horizontal and vertical pitches of approximately 100 micrometres arranged in a delta pattern. Accordingly, light spreading of less than 50 micrometres in any direction can be tolerated between the two pixel planes when two such devices are used as the SLM 41 and the modulator 42: Such LCDs typically have glass substrates with a thickness of 1.1 mm and a polariser sheet of 0.2 mm thickness. The pixel planes would therefore be separated by a minimum of 2.4 mm so that the collimation of the input light must be greater than a cone half angle of 0.02 radians in glass. Taking the refractive index of glass into account, this requires the collimation system to have an f-number of 17 or greater. Such an arrangement is illustrated in FIG. 7 and comprises glass substrates 50, liquid crystal layers 51, polarisers 52, black mask regions 53 and pixel apertures 54.

Figure 7:
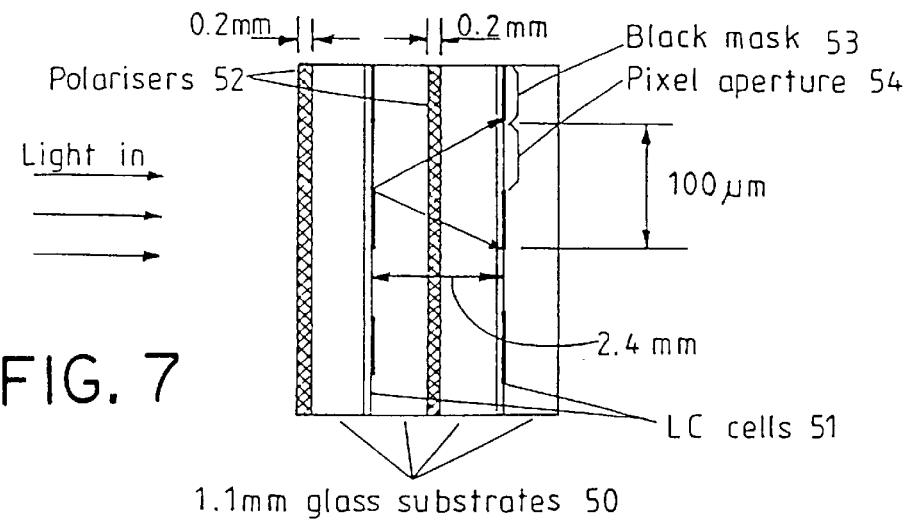
Figure 8:
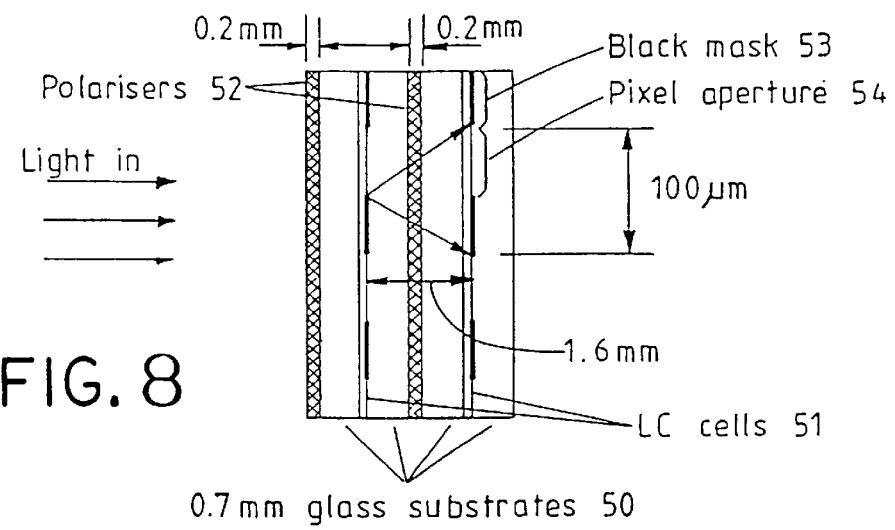

The arrangement shown in FIG. 8 differs from that shown in FIG. 7 in that the glass substrates 50 are of 0.7 mm thickness so that the pixel planes are separated by approximately 1.6 mm. This improves the system f-number to 11 and allows some relaxation of the collimation requirements of the input light. Glass substrates of 0.7 mm thickness are currently used in some LCDs.

Figure 9:
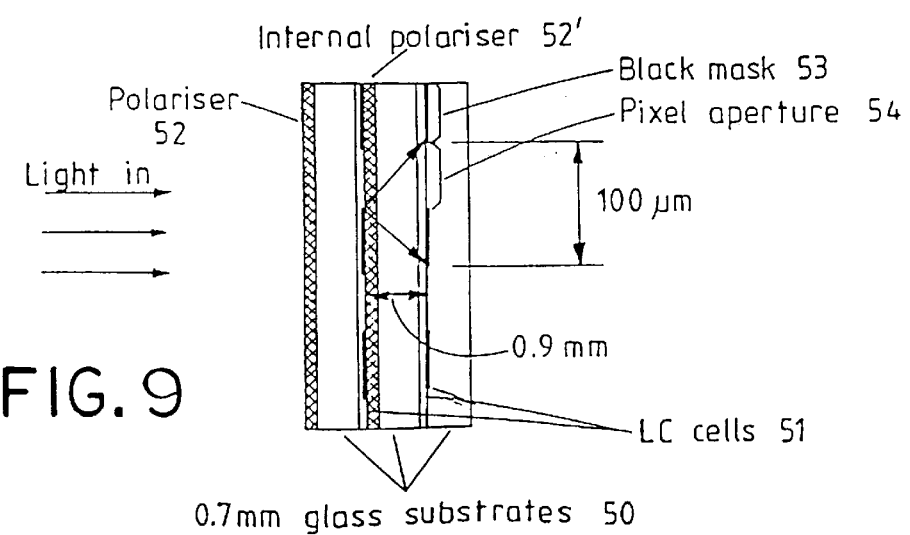

A further improvement may be made by fabricating the SLM 41 and the modulator 42 a single device comprising three substrates of 0.7 mm thickness as shown in FIG. 9. The f-number is further reduced to 9 but, in order to manufacture such a device, the internal polariser 52' must be capable of being fabricated during and surviving subsequent normal LCD fabrication processes. The arrangement shown in FIG. 9 is of improved robustness and registration between the pixels of the two layers can be more readily and accurately assured during fabrication.

Is also possible to produce a device of the type shown in FIG. 9 in which the thickness of the glass substrate 50 between the liquid crystal layers 51 is greatly reduced. For instance, it is possible to fabricate such a device in which the liquid crystal layers 51 are separated by a sheet, for instance of glass, with a thickness of the order of 50 micrometres. In the case of a device in which the size of the pixels is of the order of 100 micrometres and the pixels are separated by gaps of the order of 50 micrometres, viewing angles of up to approximately 45° are possible. Such an arrangement may be used in a direct-view type of display.

Figure 10:
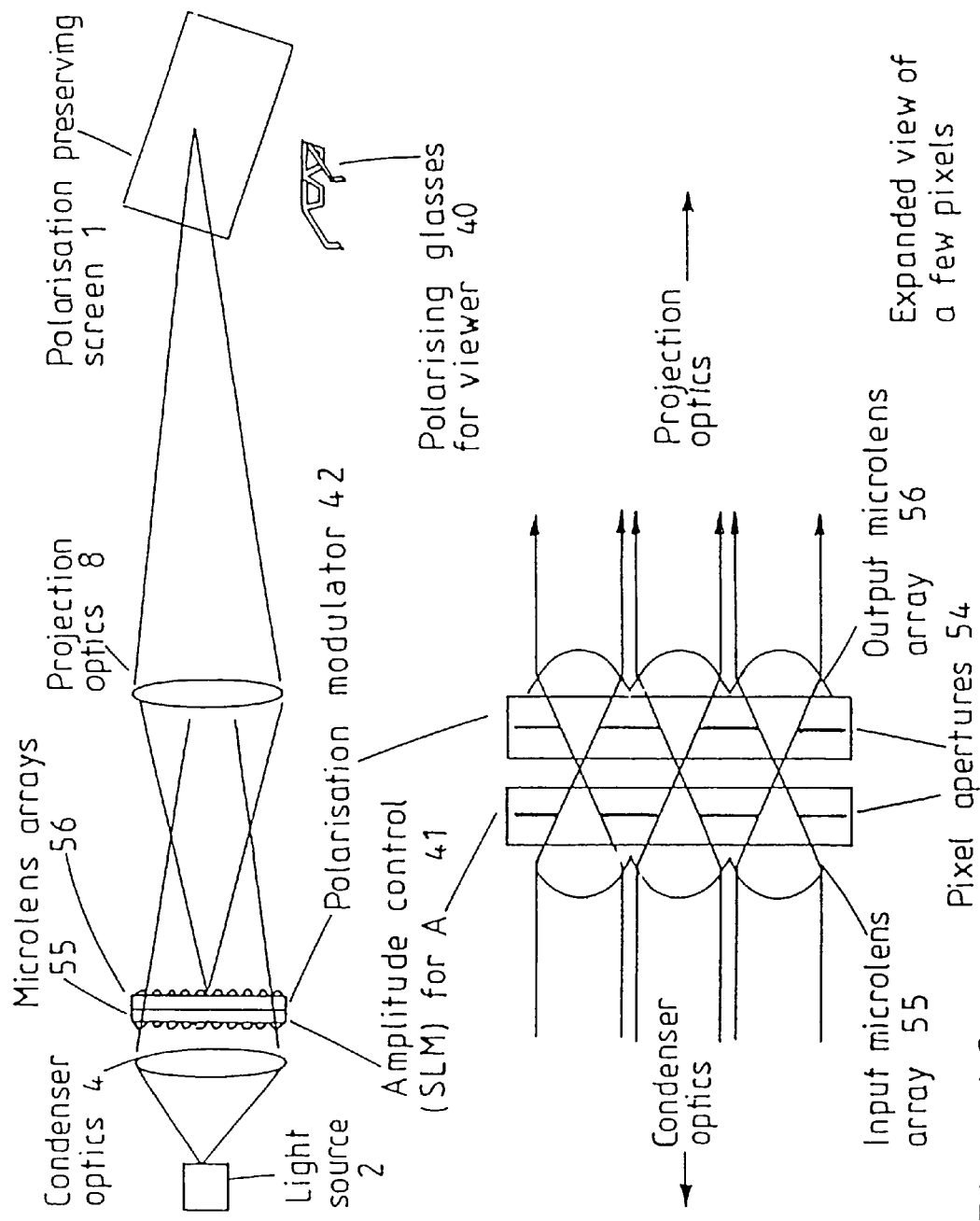
FIG. 10 is a diagram of a stereoscopic 3D display constituting another embodiment of the invention.

The display shown in FIG. 10 differs from that shown in FIG. 5 in that input and output microlens arrays 55 and 56 are provided on the input side of the SLM 41 and on the output side of the polarisation rotator/retarder 42. Each microlens of the array 55 is aligned with a pixel of the SLM 41 whereas each microlens of the array 56 is aligned with a pixel of the modulator 42. The back working distance of each microlens of the array 55 is substantially equal to the thickness of the SLM 41 whereas the front working distance of each microlens of the array 56 is substantially equal to the thickness of the modulator 42. The SLM 41 and the modulator 42 are disposed in contact with each other but are shown in the lower part of FIG. 10 with a separation for the sake of clarity of illustration.

The microlens array 55 improves the light efficiency of the display by reducing the amount of input light lost upon incidence with the black mask surrounding the edge of the pixels in the polarisation modulator 42. The collimation requirements of the light source may therefore be relaxed somewhat. The output microlens array 56 allows the use of projection optics 8 of smaller pupil by reducing the angular divergence of light leaving the modulator 42.

Figure 11:
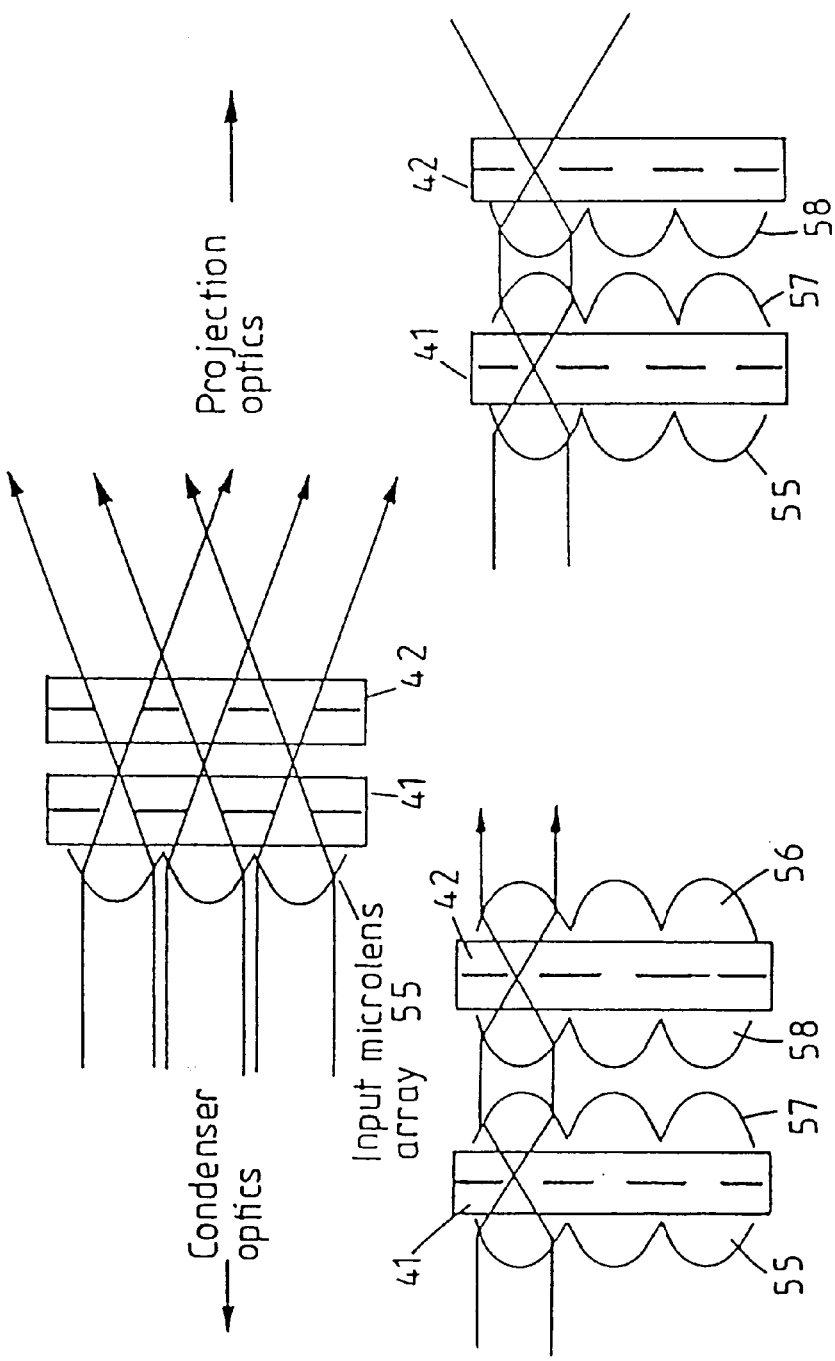
FIG. 11 illustrates three different devices which may be used in the display of FIG. 10.

FIG. 11 illustrates three alternative arrangements of microlens arrays. In the upper part of FIG. 11, an arrangement is shown in which the output microlens array 56 is omitted This is possible if the pupil of the projection lens Is sufficient to collect the majority of the light from the modulator 42.

FIG. 122 illustrates alternatives to the microlens arrangement shown in FIG. 10 and 11. In the arrangements shown in FIG. 12, the microlens arrays 55 to 58 are replaced by respective large format Fresnel lenses 55' to 58', respectively, for collimating tight passing through the modulator 41 and 42.

The lower left part of FIG. 11 illustrates an arrangement using four microlens arrays 55 to 58 permitting the SLM 41 and the modulator 42 to be spaced apart while ensuring improved passage of light from each pixel of the SLM 41 to the corresponding pixel of the modulator 42. The lower right part of FIG. 11 shows an arrangement comprising three microlens arrays which differs from the previously described arrangement in that the output microlens array 56 is omitted. This arrangement may be used where the SLM 41 and the modulator 42 are spaced apart and the pupil of the projection optics is sufficient to collect the majority of light from the modulator 42.

Figure 12:
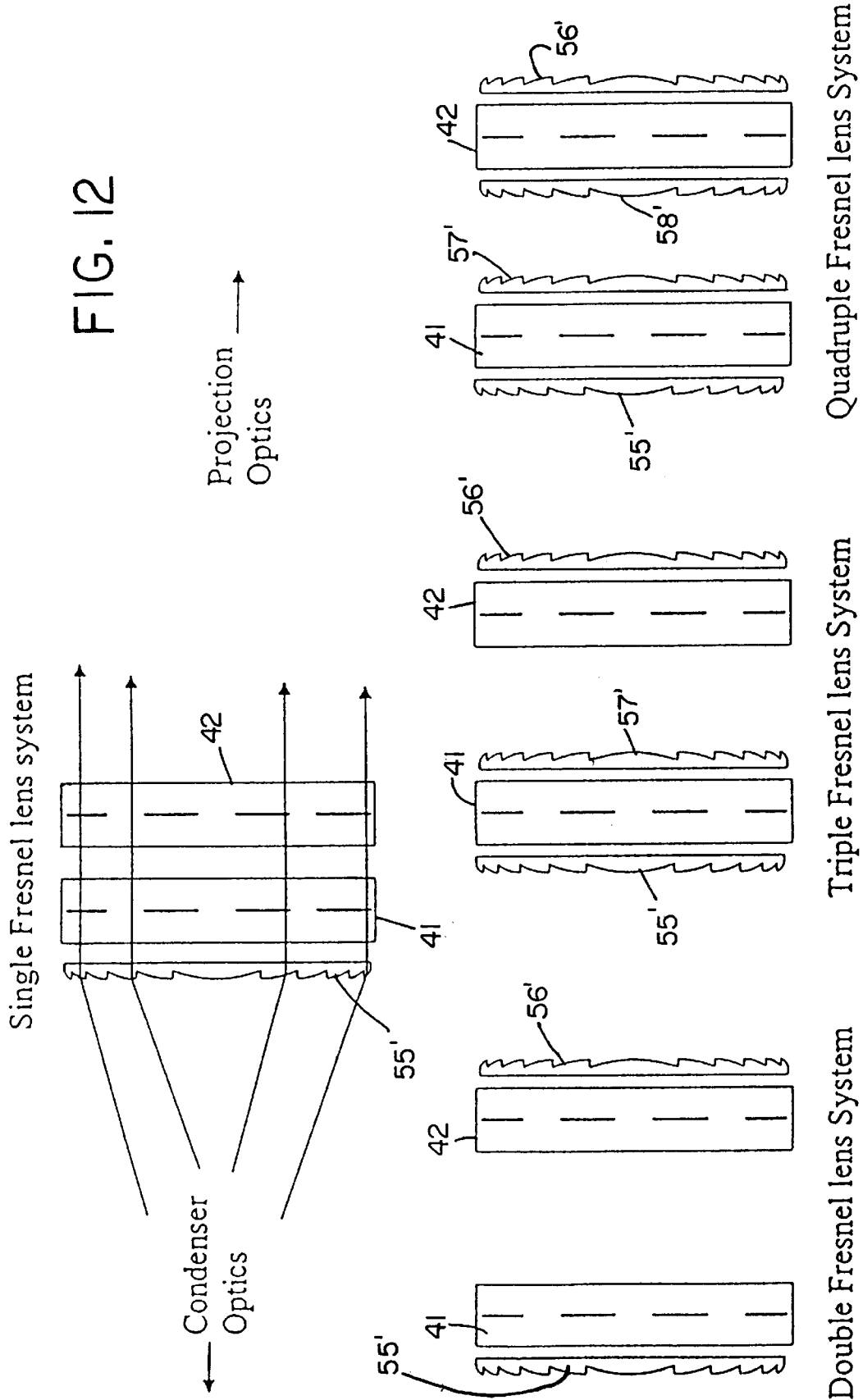
FIG. 12 illustrates alternative arrangements to those shown in FIGS. 10 and 11.

FIG. 12 shows arrangements which are similar to those illustrated in FIGS. 10 and 11 but in which the microlens arrays are replaced by Fresnel lenses. The arrangement shown in the upper part of FIG. 12 comprises a single input Fresnet lens 55'. The lower part of FIG. 12 illustrates double, triple and quadruple Fresnel lens arrangements with the input Fresnel lens 55' being disposed at the input side of the SLM 41, an output Fresnel lens 56' disposed at the output side of the modulator 42, and intermediate Fresnel lenses 57' and 58' disposed at the output side of the SLM 41 and the input side of the modulator 42, respectively.

Figure 13:
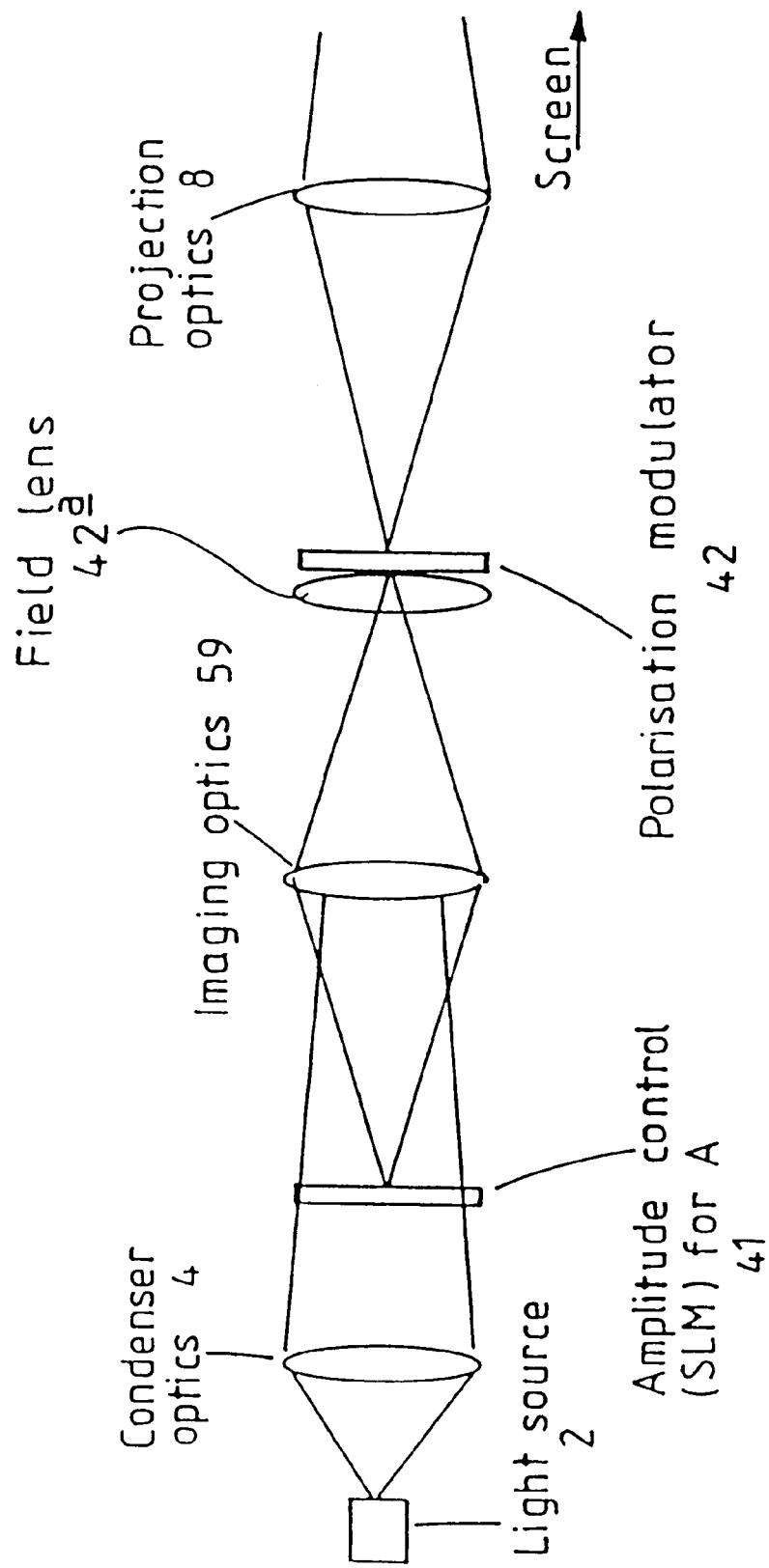
FIGS. 13 to 16 show stereoscopic 3D projection displays constituting further embodiments of the invention.

FIG. 13 shows a display which differs from that shown in FIG. 5 in that the SLM 41 and the modulator 42 are spaced apart and imaging optics 59 are disposed therebetween. A field lens 42a is also provided close to the modulator 42 to keep the illumination light within the pupil of the projection optics 8. The imaging optics 59 image the pixel plane of the SLM 41 onto the pixel plane of the modulator 42 such that each pixel of the SLM 41 is imaged onto the corresponding pixel of the modulator 42. This allows for relaxation in the collimation of the illumination.

Figure 14:
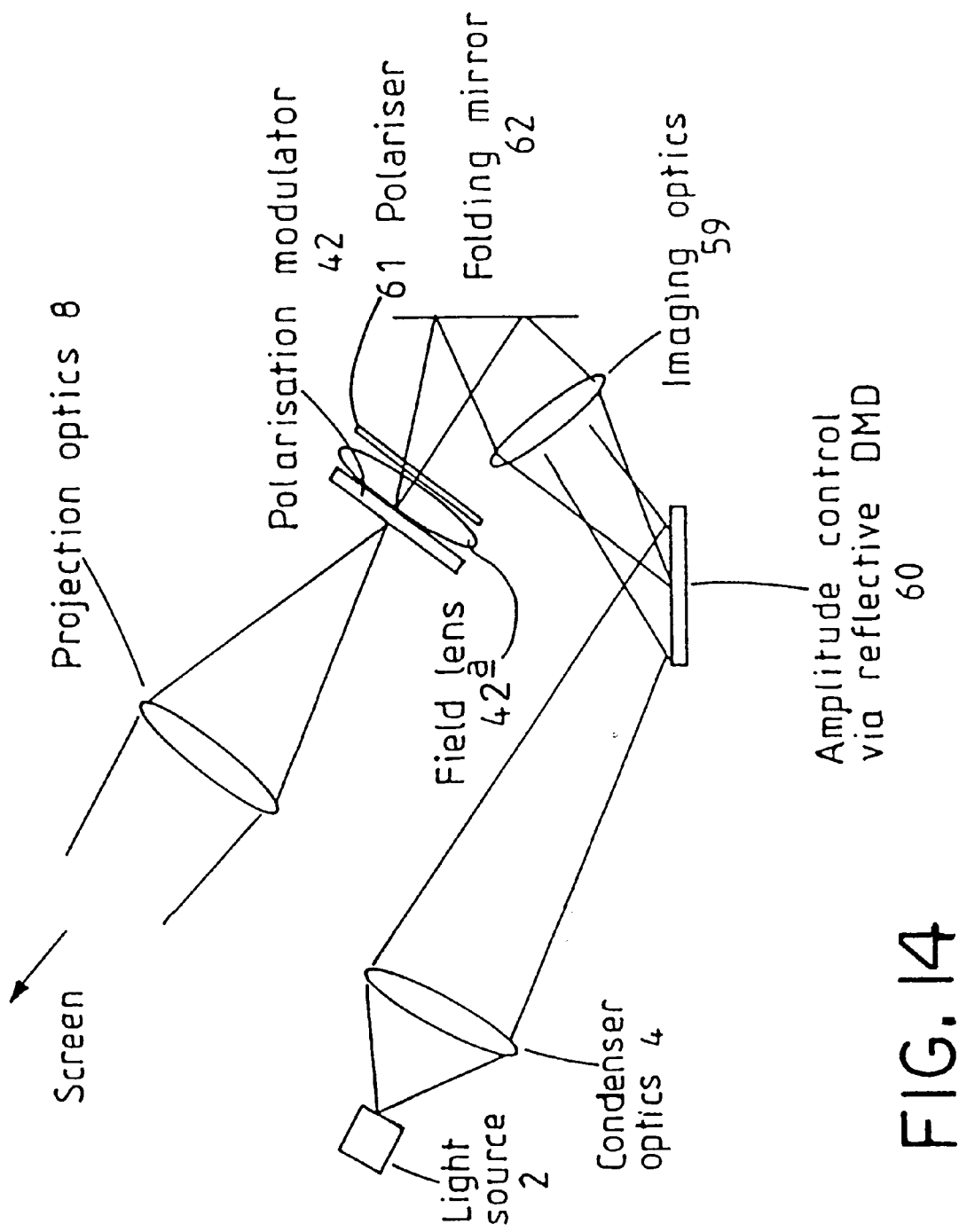

The display shown in FIG. 14 differs from that shown in FIG. 13 in that the SLM 41 Is replaced by a reflective type of amplitude modulator in the form of a deformable mirror device 60. A folding plane mirror 62 is disposed between the devise 60 and the modulator 42. The folding mirror 62 is optional and provides a more compact arrangement for the display, if the mirror 62 is used, a polariser 61 can be provided between the mirror 62 and the modulator 42, and a field lens 42a can be provided between the polariser 61 and the modulator 42.

The device 60 comprises an array of mirrors which are controllable so as to tilt and reflect light in or out of the imaging path. Grey scale may be achieved by time sequential methods. The pixels of the device 60 are imaged onto the corresponding pixels of the modulator 42 by the imaging optics 59 via the mirror 62. The polariser 61 is necessary in this embodiment to ensure that the light reaching the modulator 42 has a defined polarisation direction. Alternatively, a reflective LCD may be used as the amplitude control element 60.

Figure 15:
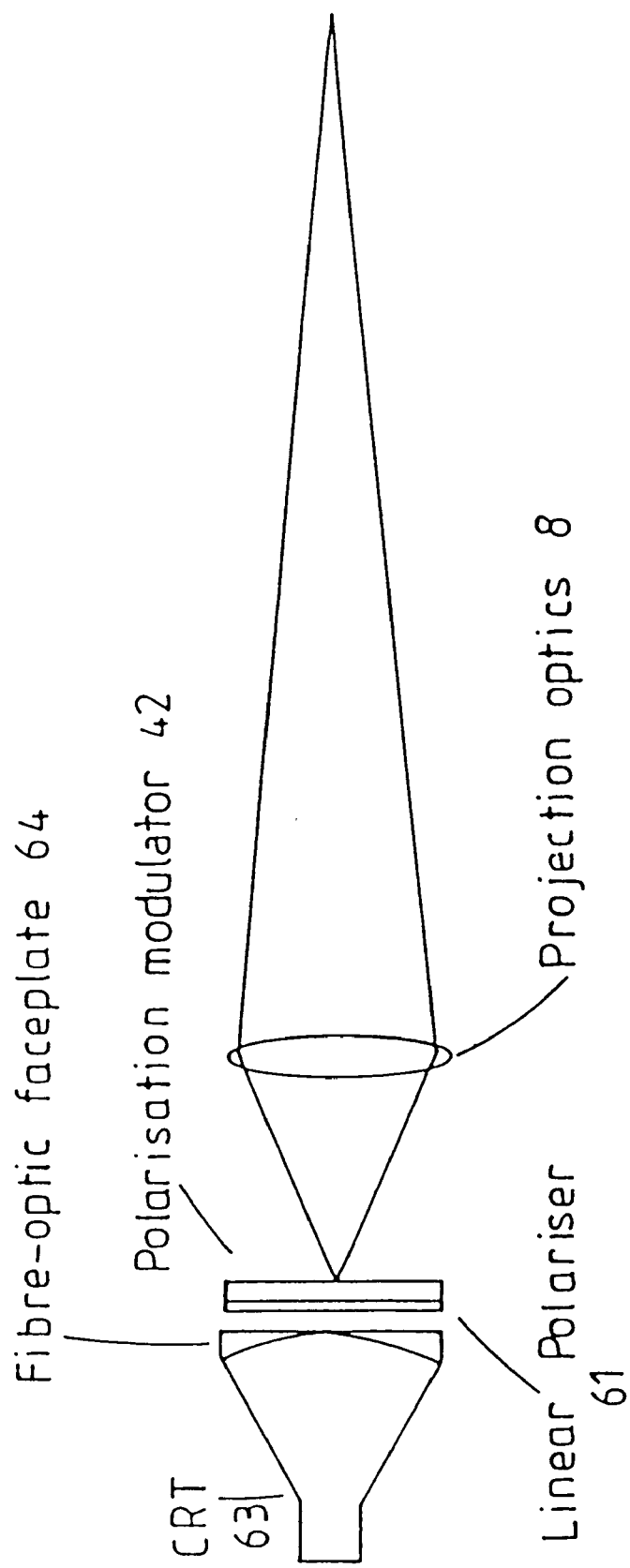

The display shown in FIG. 15 comprises a CRT 63 which effectively replaces the light source 2, the condenser optics 4, and the SLM 41 of the display shown In FIG. 5. The CRT 63 thus effectively forms the light source and amplitude modulator and is optionally provided with a fibre optic face plate 64 to "flatten" the output plane of the image formed on the curved front face of the CRT 63. The linear polariser 61 is again necessary to provide a defined direction of polarisation of light incident on the polarisation modulator 42. The microlens arrays 56 and 58 may optionally be used with the modulator 42. Otherwise, the display works in the same way as described hereinbefore.

Figure 1:
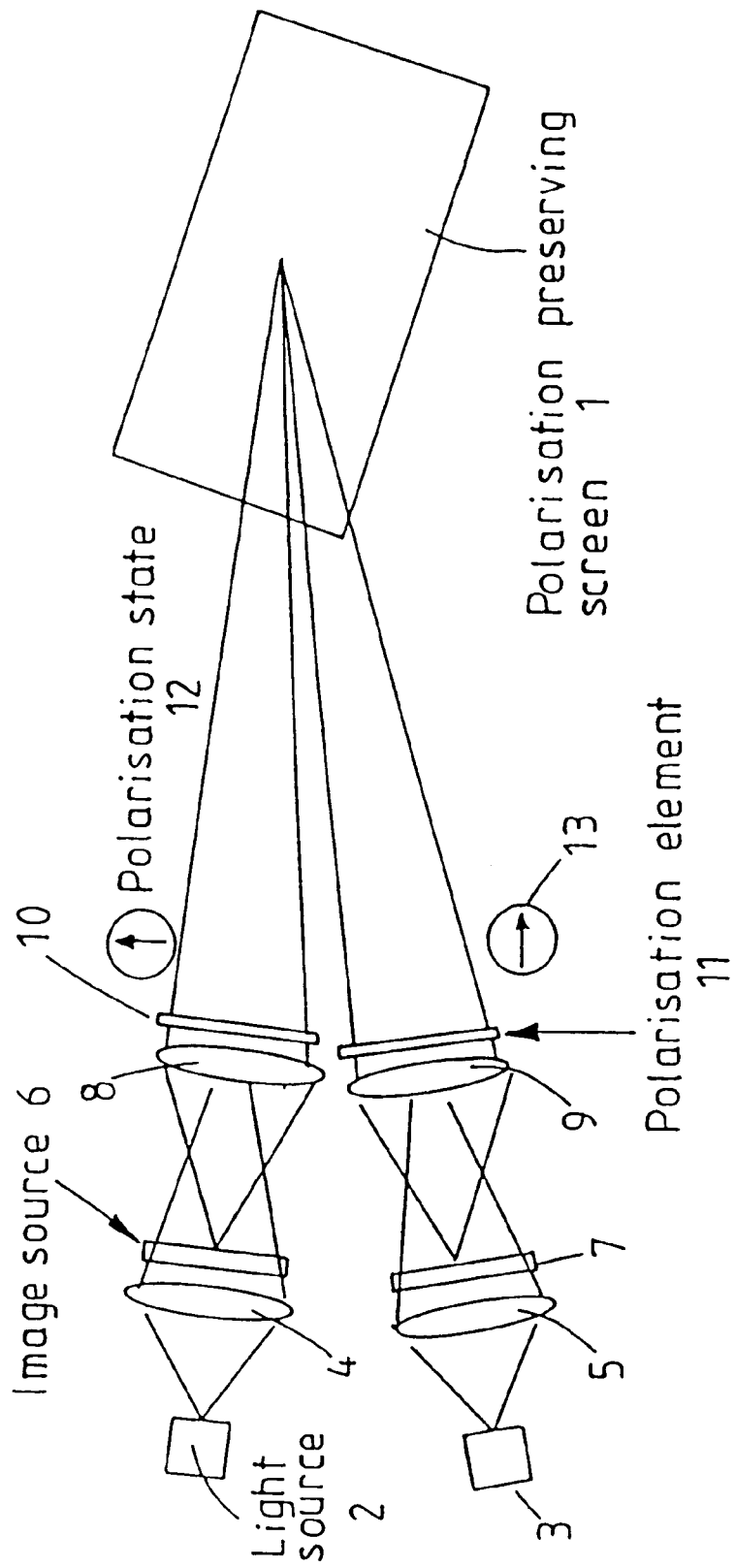
FIGS. 1 to 4 are diagrams showing known types of stereoscopic 3D projection displays.
Figure 2:
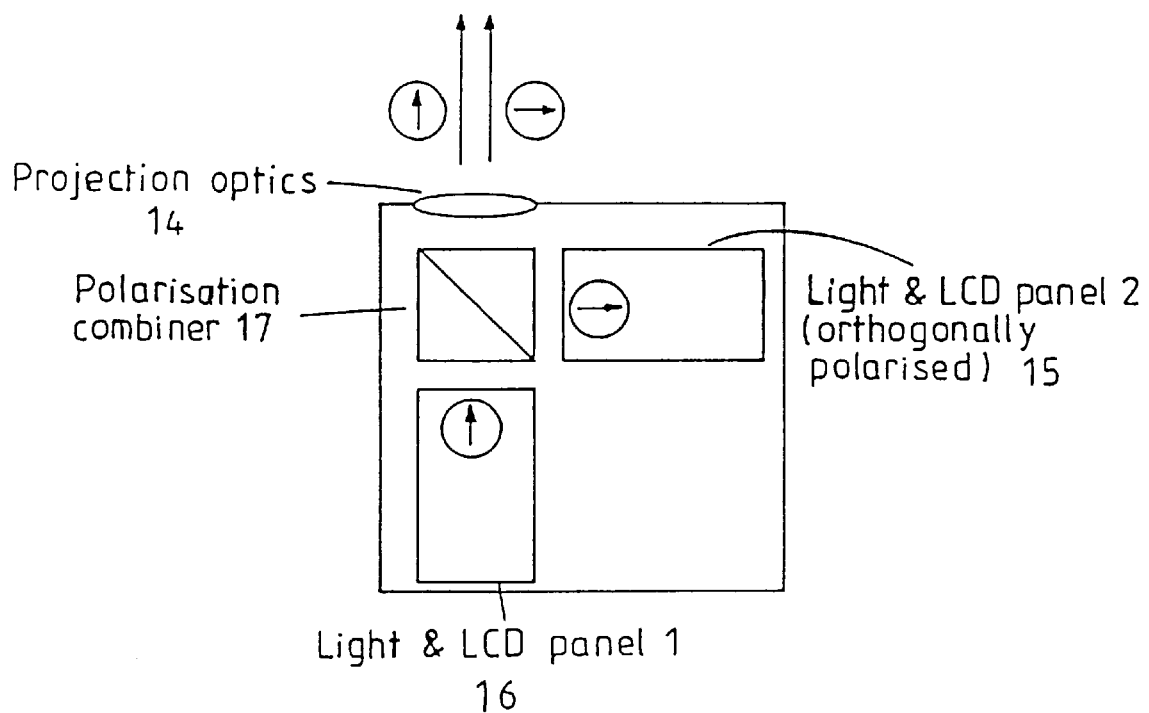
Figure 3:
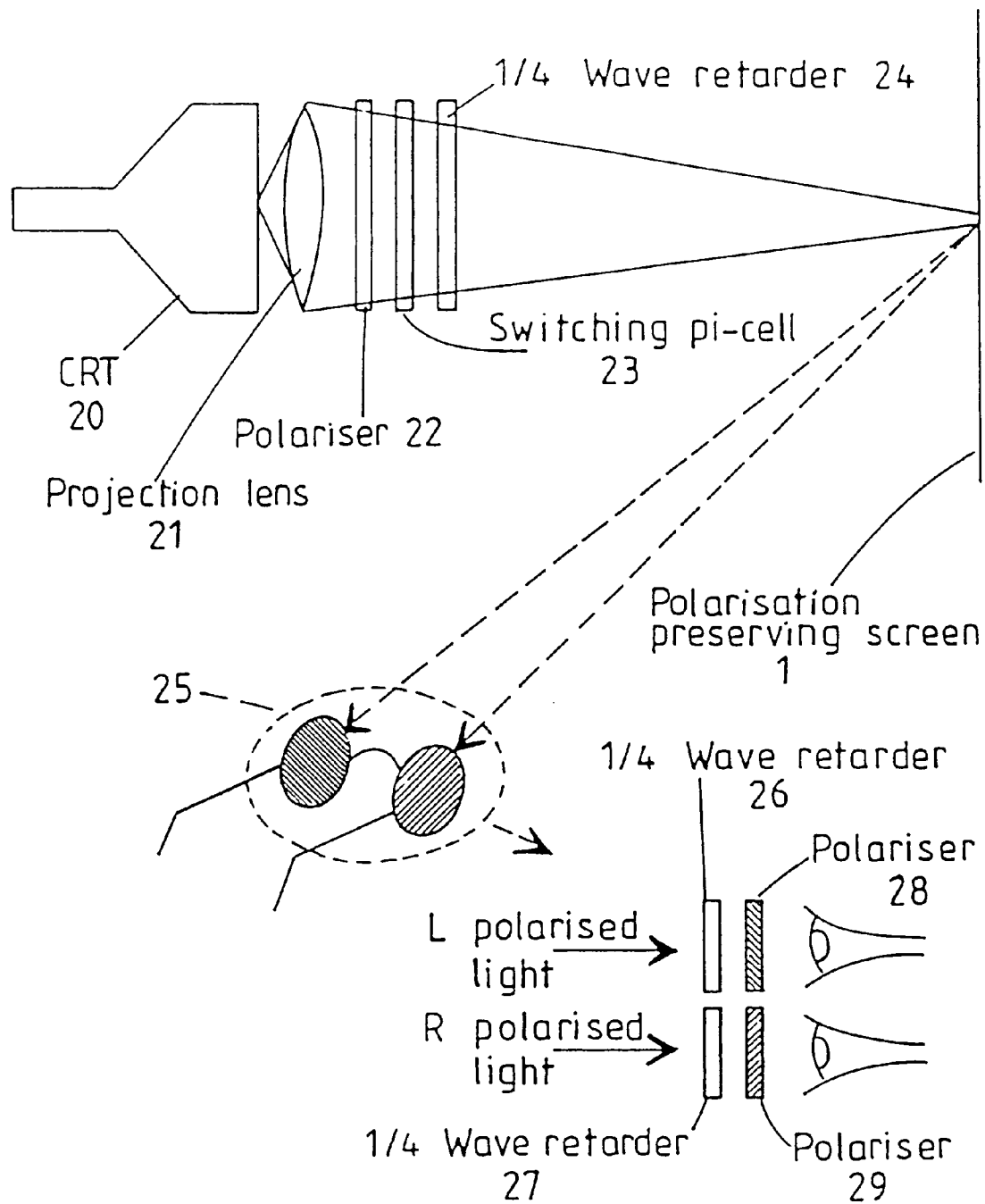
Figure 16:
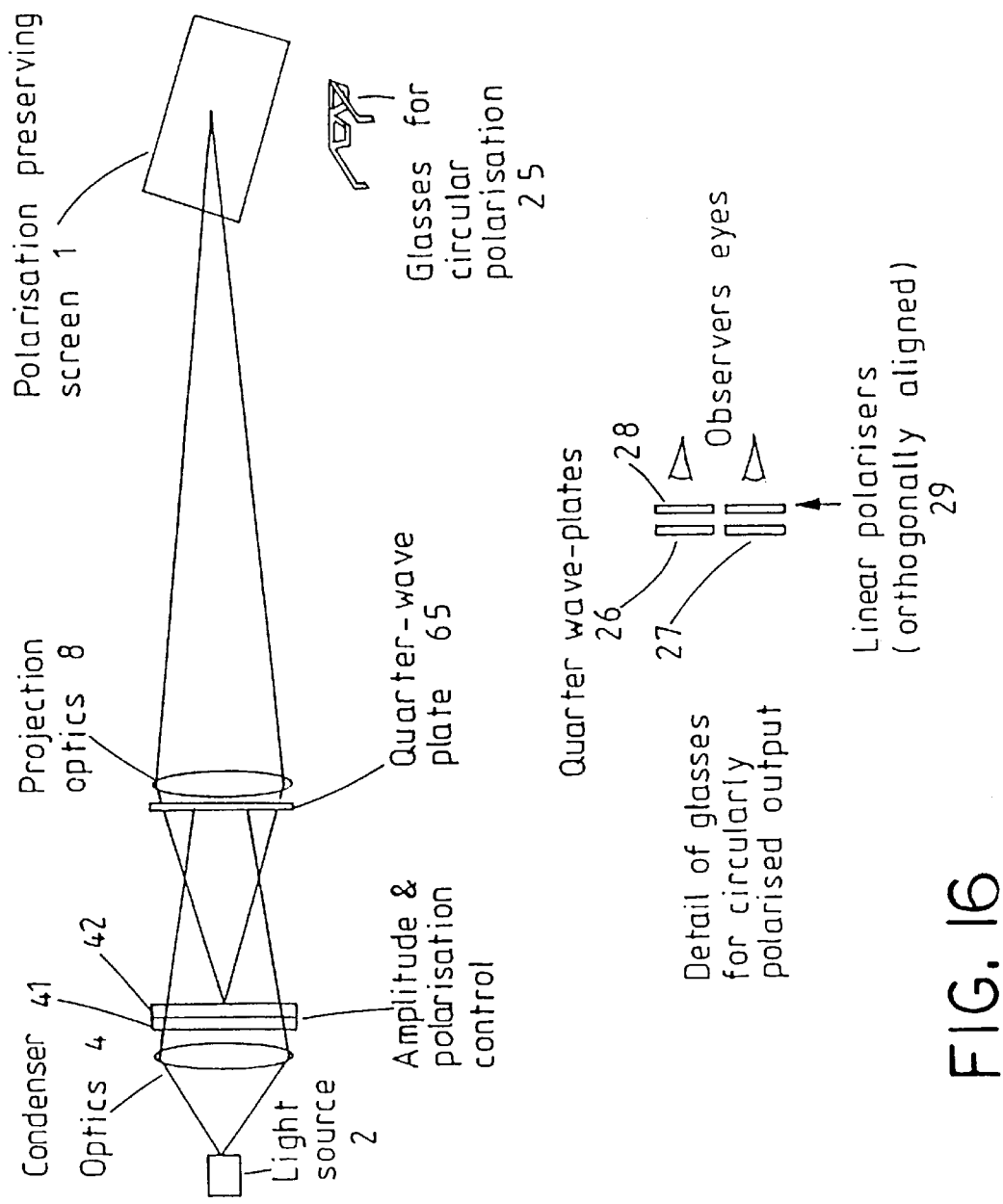

The display shown in FIG. 16 differs from that shown in FIG. 5 in that a quarter waveplate 65 is disposed between the polarisation modulator 42 and the projection optics 8. The quarter waveplate 65 thus converts the orthogonal linear polarisations to circular polarisation of opposite handedness. The glasses 25 are of the type shown in FIG. 3 and comprise quarter waveplates 26 and 27 in front of orthogonally aligned linear polarisers 28 and 29. The quarter waveplates 26 and 27 thus convert the circularly polarised light back to orthogonal linearly polarised light.

The quarter waveplates 26, 27 and 65 may be multilayer devices in order to provide Improved wider band performance.

In a modified form of the embodiment shown in FIG. 16, the quarter waveplate 65 is omitted and the polarisation modulator 42 is arranged to produce right hand and left hand circular polarisation directly, for instance by acting as a quarter waveplate whose optical axis is switchable between +45° and −45° with respect to the input linear polarisation state.

An advantage of the display shown in FIG. 16 is that the increased cross-talk caused by head tilting Is substantially eliminated. In the case of orthogonal linear polarisation, tilting of the head and hence of the glasses 25 causes the linear polarisers within the glasses to become misaligned with the orthogonal polarisation directions of light from the screen 1. Thus, some of the light intended for the left eye is received by the right eye and vice versa. This results in cross-talk which causes undesirable visual artefacts in the 3D image. By using circular polarisation, this effect is substantially eliminated. However, head rotations about a vertical axis and head nods can increase cross-talk with circular polarisation. Further, quarter waveplates have worse chromatic performance than linear polarisers and this may be disadvantageous in some applications.

Figure 17:
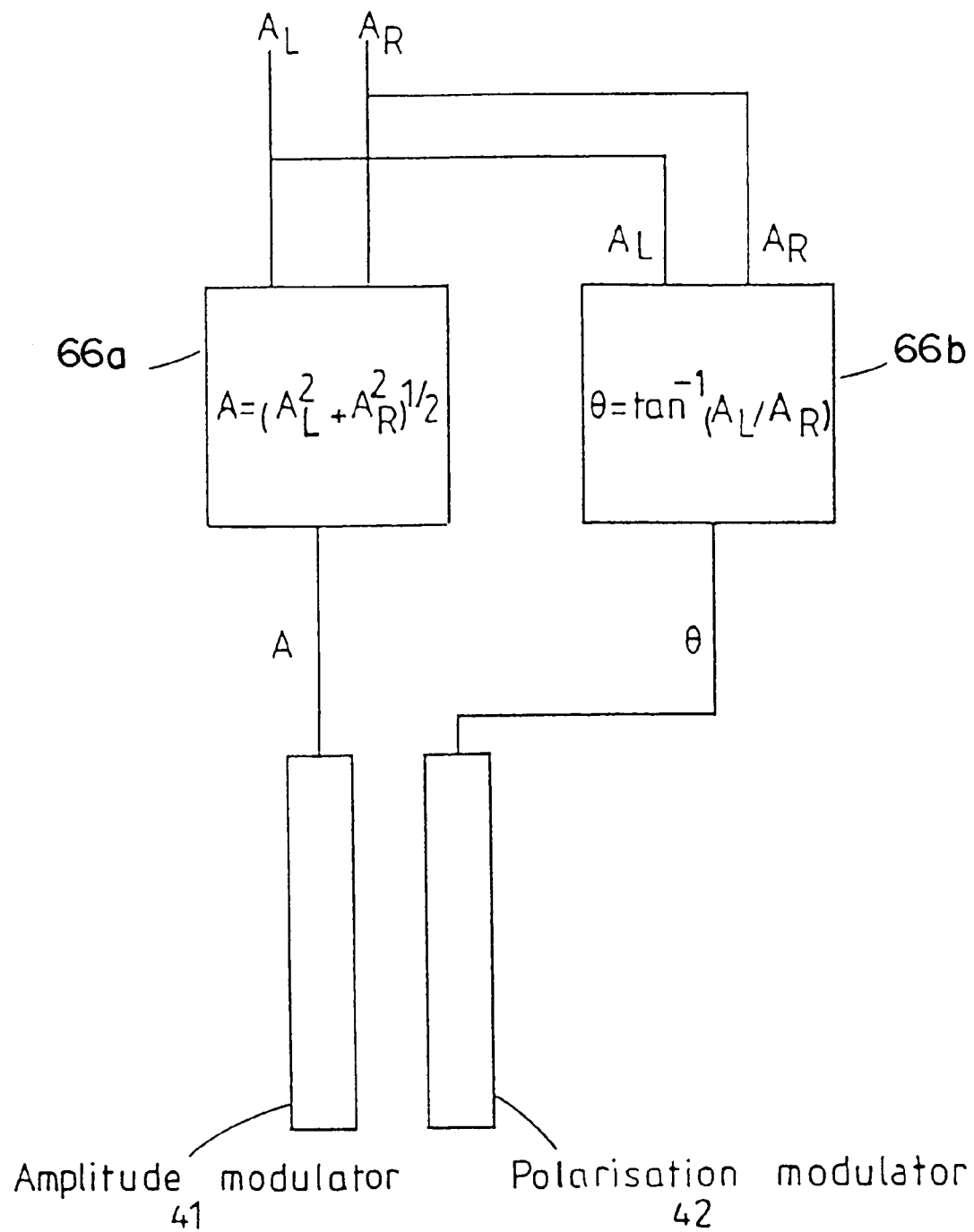
FIGS. 17 and 18 are block diagrams illustrating circuits for controlling display elements.

FIG. 17 illustrates a drive arrangement for driving the SLM or amplitude modulator 41 and the polarisation modulator 42. Signals $A_L$ and $Ae_R$ representing the light amplitudes of the left and right images, respectively, of the stereoscopic pair are supplied to first and second processing circuits 66a and 66b. The circuit 66a forms a signal A for controlling the light amplitude by means of the amplitude modulator 41 in accordance with the expression $\sqrt{A_L^2 + A_R^2}$, whereas the circuit 66b provides a control signal $\theta$ to the polarisation modulator 42 controlling the angle of polarisation In accordance with the expression $\tan^{-1}(A_L/A_R)$. In practice, these calculations may be performed in an image source, such as a computer, or In the display Itself. If done In the display itself, use may be made of analogue multiplier integrated circuits, such as Analogue Devices integrated circuits numbers AD532, AD534, AD538, AD632 and AD633. For better accuracy in the arc-tangent function, a universal trigonometric function converter such as an AD639, also available from Analogue Devices, may be used. Alteratively, an analogue-digital converter and look-up table, for instance stored in programmable read-only memory, may be used but the infinite range of the arc-tangent function has to be considered. Depending on the number of grey scales, all values of $A_L/A_R$ greater than a predetermined value may be assigned to full rotation to avoid the infinite limits of the arc-tangent function.

Figure 18:
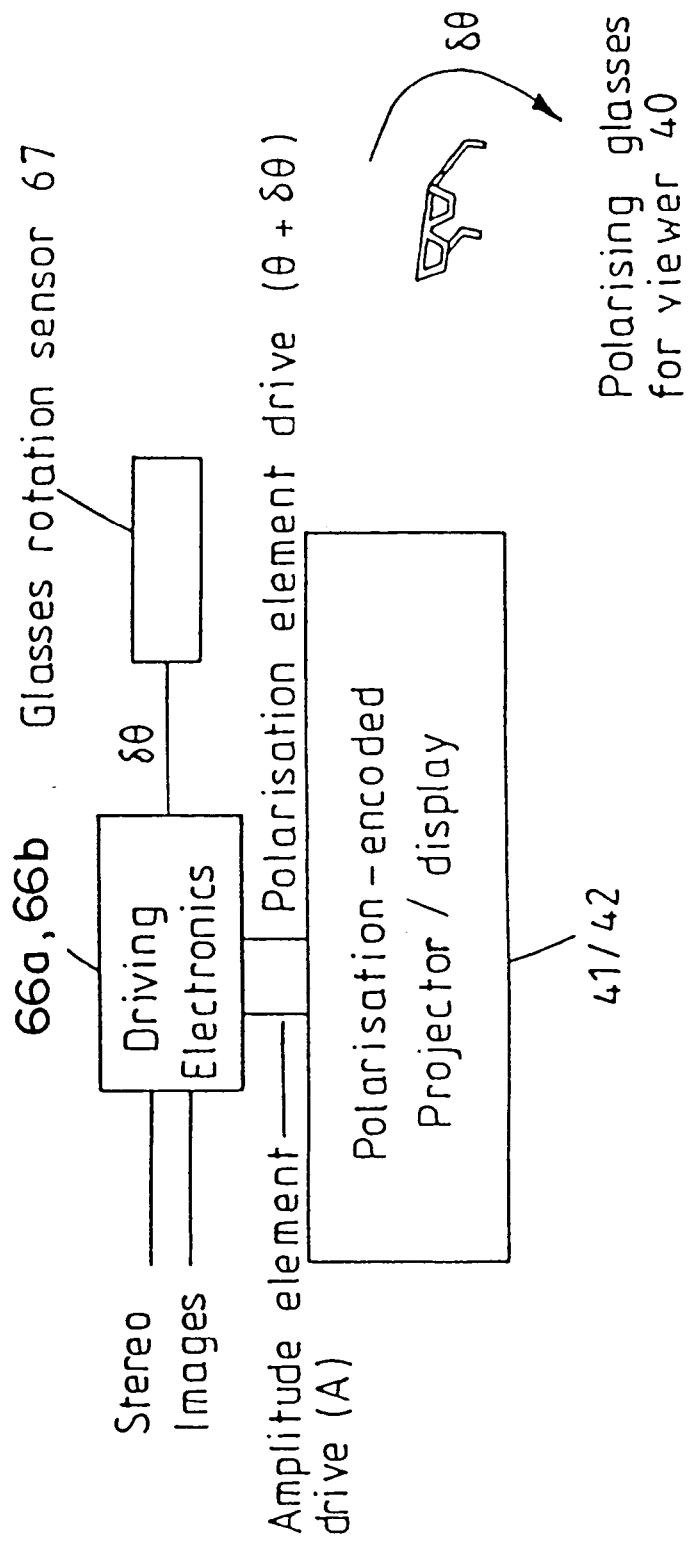

FIG. 18 shows a modification of the arrangement shown in FIG. 17 for use with a polarisation modulator 42 which is capable of varying the output polarisation over a range greater than 90° in order to compensate for head tilt of a viewer. A glasses rotation sensor 67 of any suitable type monitors tilting of the glasses 40 about an angle $\delta\theta$ and supplies a signal representing the tilt angle to the driving electronics 66a, 66b. The signal is added to the output of the circuit 66b so that the polarisation modulator 42 produces an output polarisation equal to $(\theta+\delta\theta)$. The polarisation thus tracks rotation of the glasses so that the polarisation directions of the lenses remain aligned with the extreme polarisation directions produced by the modulator 42. Thus, cross-talk caused by tilting of the glasses 40 may be substantially eliminated.

Figure 19:
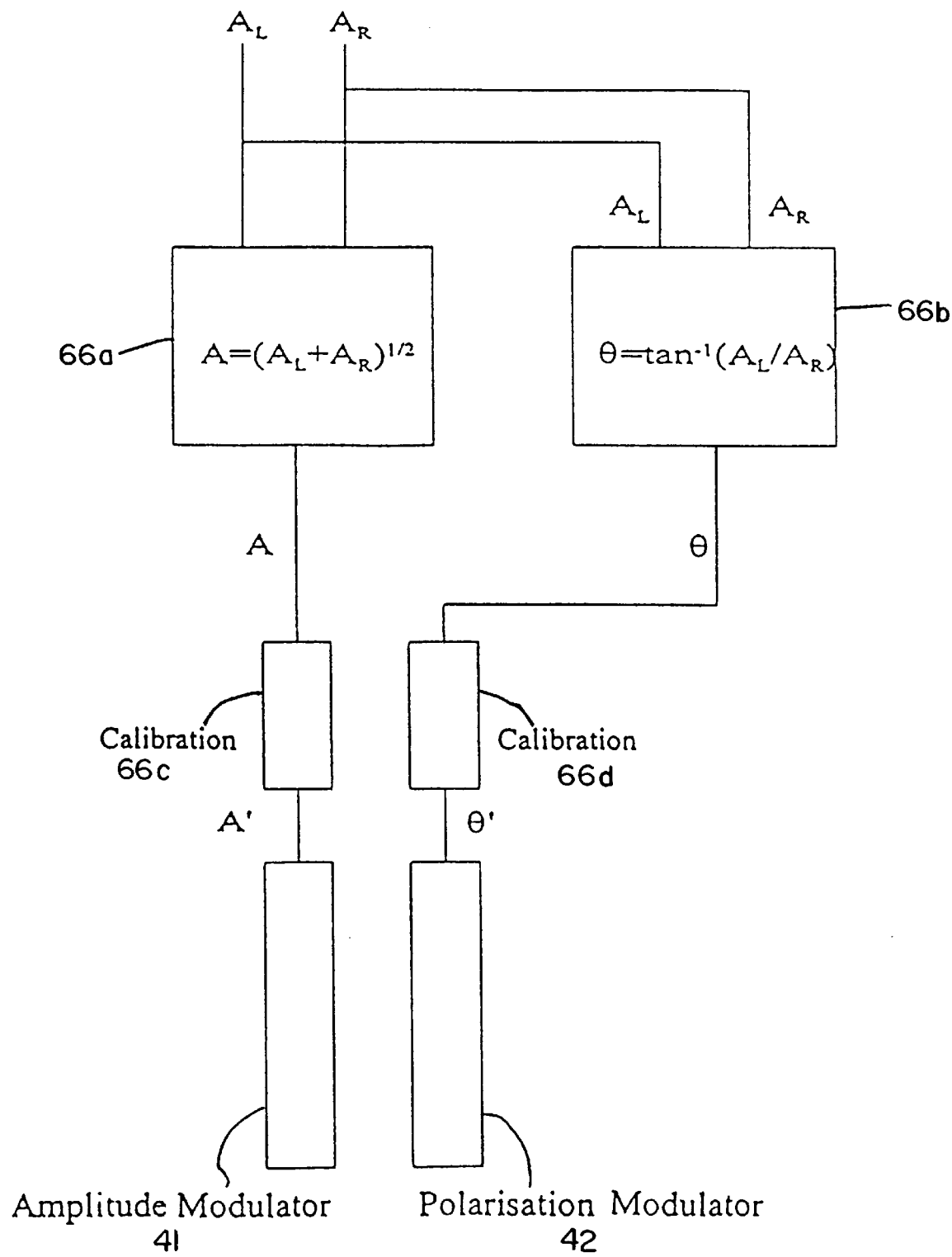
FIG. 19 is a block diagram illustrating a modification of the circuit shown in FIG. 17.
Figure 20:
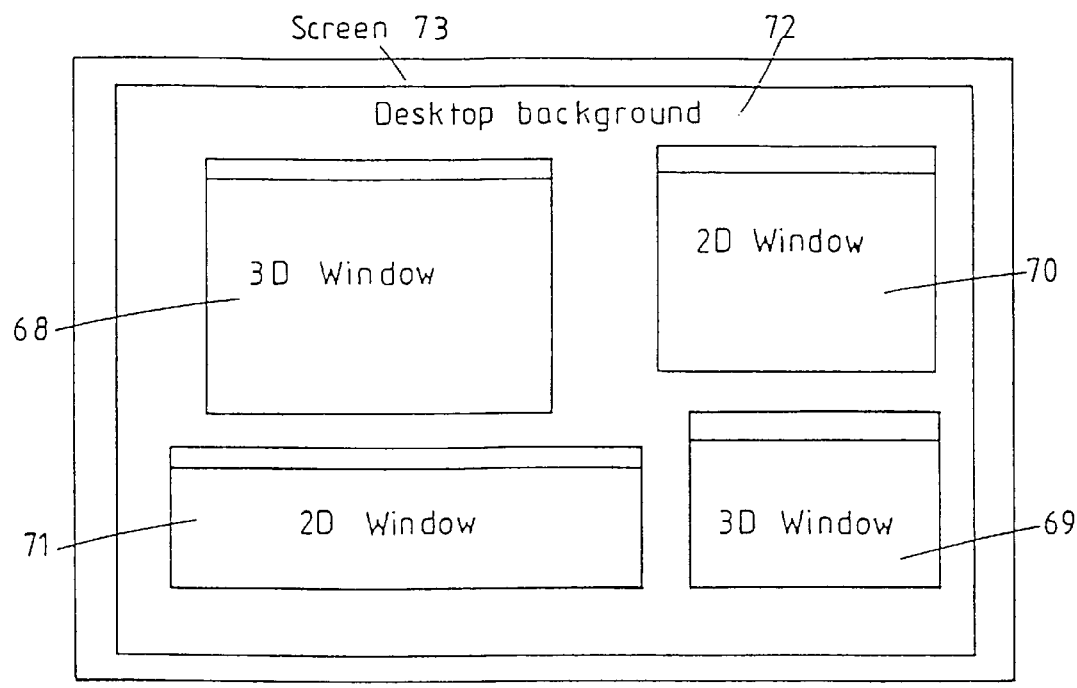
FIG. 20 illustrates mixed 2D and 3D images provided by a display.

FIG. 19 illustrates an extension to the driving scheme illustrated in FIG. 17. In this case, the interface to the modulators 41 and 42 allows for separate adjustment of the calibration such that the sensitivity of the pixels to the voltage levels of the input signals can be adjusted by means of calibrations 66c and 66d. In the case of colour displays, three calibrations may be necessary for the different colours supplied by the amplitude modulator 41 with a respective calibration for each set of pixels associated with a respective colour filter.

In order for the display or part of the display to display a 2D image, it is merely necessary for the amplitudes $A_L$ and $A_R$ in corresponding pairs of pixels to be made equal and all the corresponding pixels of the modulator 42 to remain in a neutral mode giving a polarisation state with equal transmission for the two lenses of the glasses 40. For instance, FIG. 18 illustrates an image which may be displayed by any of the displays constituting embodiments of the invention. The image is made up of 3D windows 68 and 69 simultaneously with 2D windows 70 and 71. An appropriate desk top background is illustrated at 72 and the extent of the screen is illustrated at 73. If it is only required to display a 2D image, the glasses may be removed so as to increase the amount of light received by the observer eyes and provide a brighter perceived image.

Figure 21:
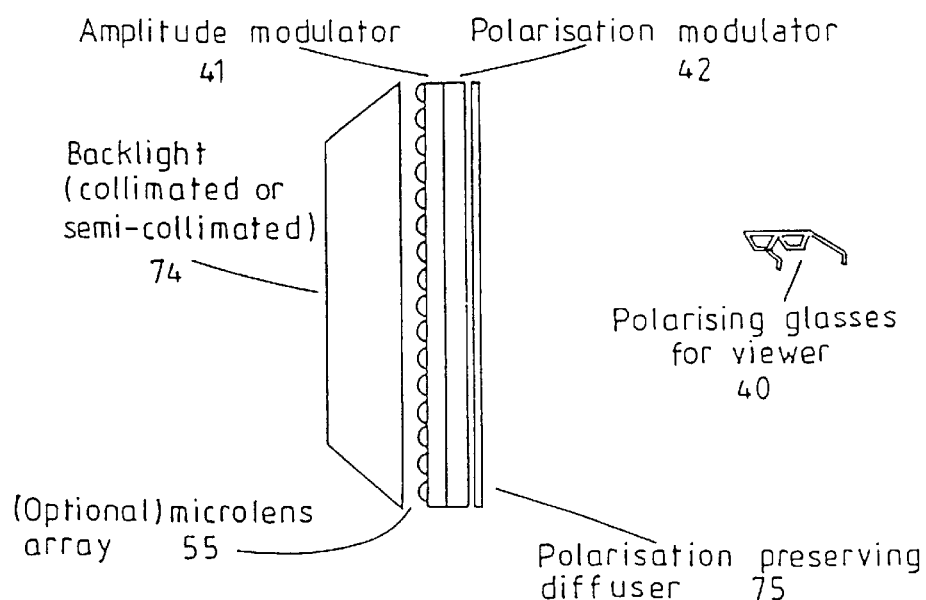
FIG. 21 is a diagram showing a stereoscopic 3D direct view display constituting a further embodiment of the invention.

FIG. 21 shows a stereoscopic 3D display of the direct view type comprising an amplitude modulator 41 and a polorisation modulator 42 of the type described hereinbefore. Although the light sources and collimation optics described hereinbefore may be used with a direct view display of the type shown in FIG. 21, the illustrated embodiment comprises a backlight 74 of the collimated or self-collimated type. As shown, the display may also comprise a microlens array 55 of the type shown in FIGS. 10 and 11. However, the projection optics and screen of the projection embodiments are replaced by a polarisation preserving diffuser 75 which is viewed directly by an observer through the polarising glasses 40. The diffuser 75 is based on refraction rather than scattering so as to maintain the polarisation of light from the modulator 42. The diffuser 75 may, for instance, comprise a layer of small glass beads or a lenticular screen. The presence of the diffuser 75 permits the observer to perceive the stereoscopic image throughout a sufficiently large range of viewing angles.

Figure 22:
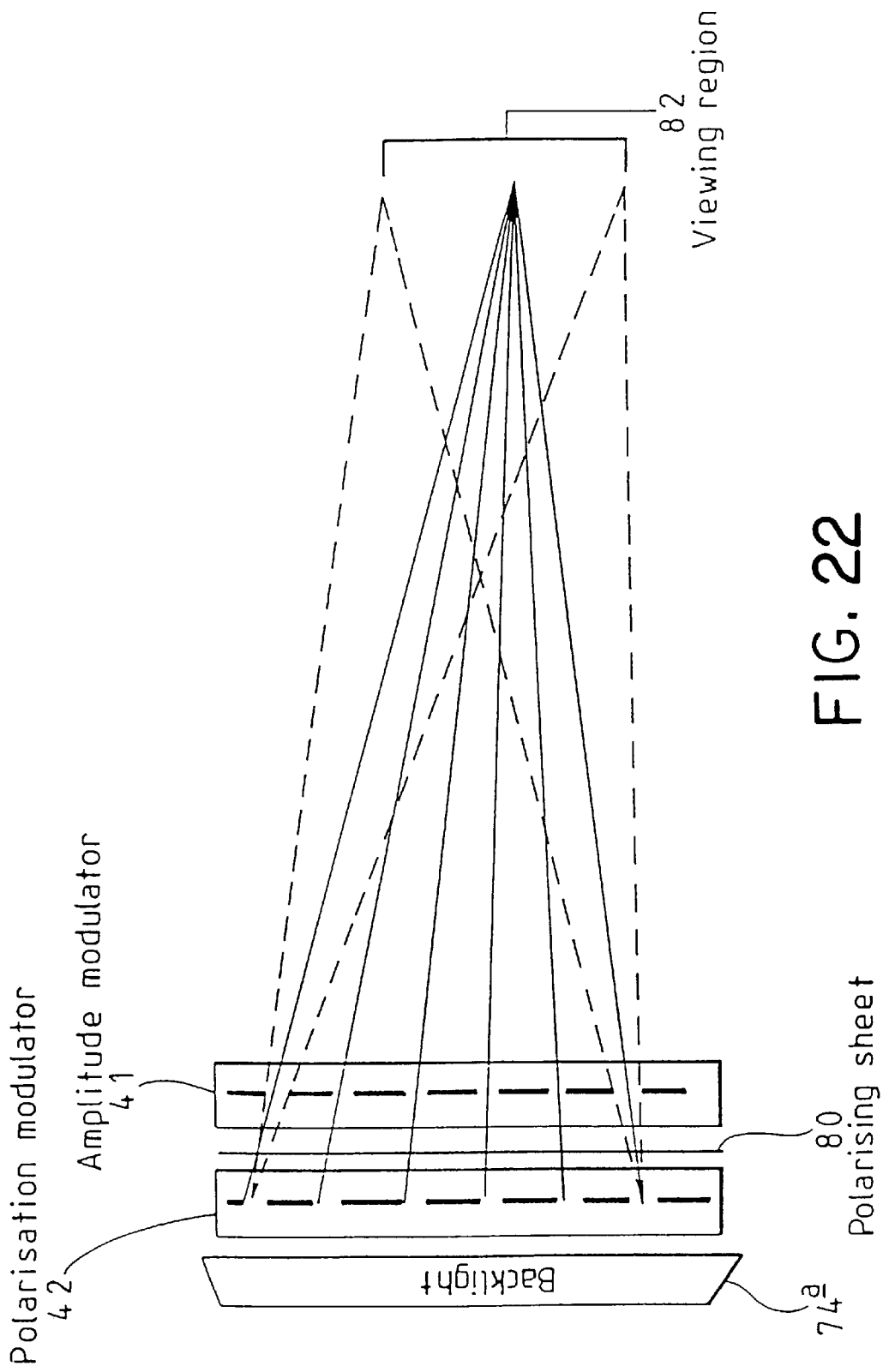
FIG. 22 is a diagram showing a stereoscopic 3D direct view display constituting another embodiment of the invention.

FIG. 22 illustrates another embodiment which differs from that shown in FIG. 21 in that a standard, non-collimated, backlight 74 is used and the diffuser 75 is replaced by a polarising sheet 80 disposed between the modulator 41 and the modulator 42. The display is provided with an observer tracking mechanism (not shown) for instance of known type comprising a sensor for detecting the observer's position and mechanical means. The mechanical means is arranged to move the two modulators 41 and 42 relative to each other so that light propagating in the direction of the observer accordingly passes through the respective correct two pixel apertures in the modulators 41 and 42 so as to move a viewing region 82 of the display. This makes the display essentially directional and secondary viewers will riot perceive a correct stereoscopic Image. The pixel pitch of the polarisation modulator 42 is adjusted in the horizontal and vertical directions in order that parallax is satisfied over the whole display surface for a viewer within the viewing region 82.

Figure 23:
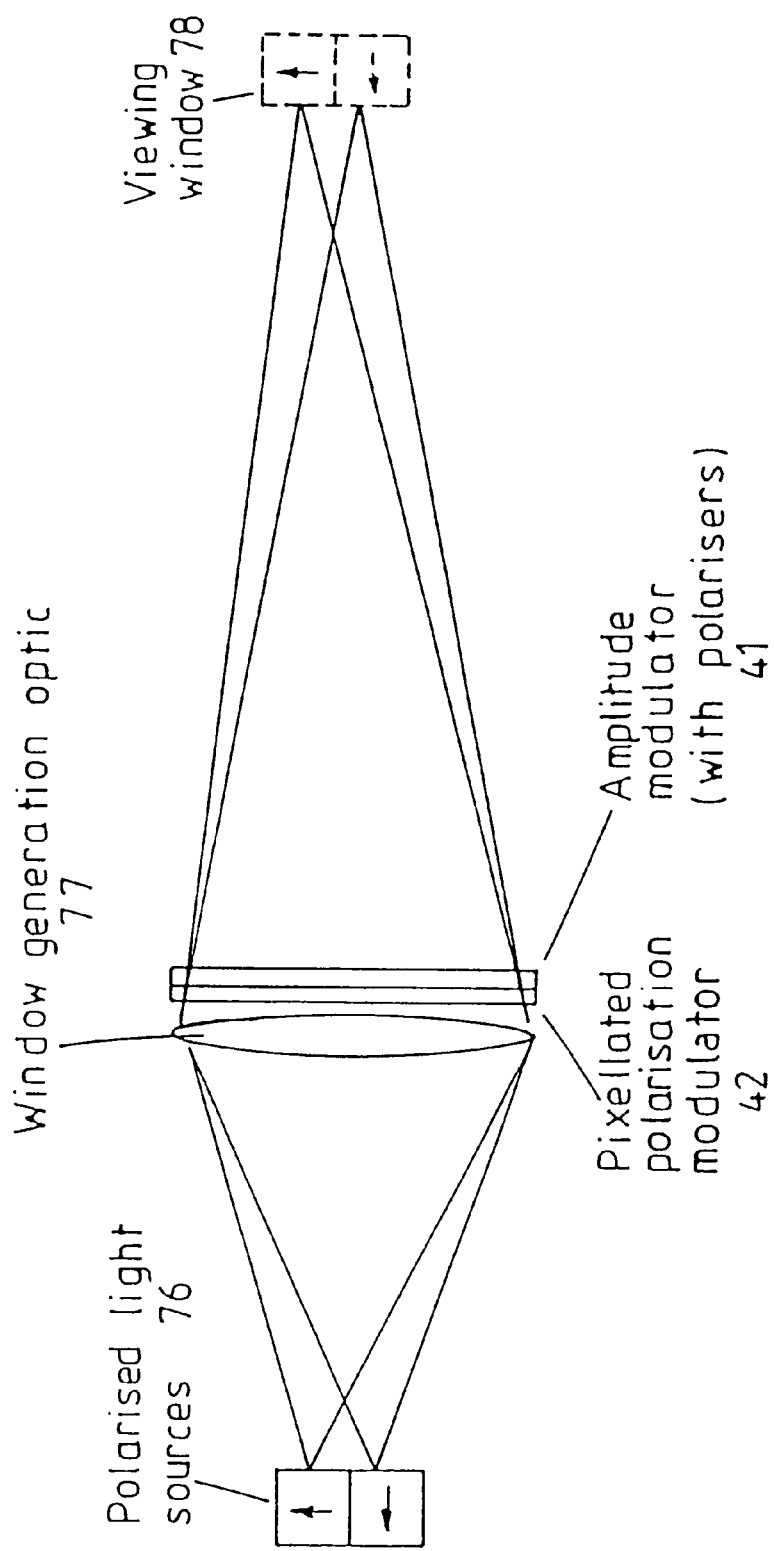
FIG. 23 is a diagram showing an autostereoscopic 3D display constituting a further embodiment of the invention.

FIG. 23 shows an autostereoscopic 3D direct view display which does not require an observer to wear polarising glasses in order to perceive the 3D effect. The display of FIG. 22 differs from the stereoscopic displays described hereinbefore in that the polarisation modulator 42 is disposed in front of the amplitude modulator 41 in the light path of the display. Further, the light sources are replaced by a pair of polarised light sources 76 which supply light of orthogonal linear polarisations. The collimation optics are replaced by a window generation optic 77 which forms viewing windows 78 for the eyes of the observer such that, when the left and right eyes of the observer are disposed in the left and right viewing windows 78, the 3D effect is perceived. Alternatively, any of the illumination arrangements disclosed in GB 2 296 099, GB 2 296 151 and EP 0 721 132 may be used in place of the light sources 76 and optic 77.

The relative intensities of the left and right image pixels ($A_L/A_R$) are determined by the effect of the polarisation modulator 42 on the polarised light sources 76 and the analyzing effect of the input polariser of the amplitude modulator 41. Once the relative amplitudes are set in this way, the overall amplitude Is determined by the amplitude modulator 41. The modulator 42 and the amplitude modulator 41 are controlled in the same way as described hereinbefore, for instance with reference to FIG. 17 or 19. Thus, each pixel of the devices 41 and 42 define the intensities or light amplitudes of corresponding pixels of the left and right eye images which are then separated into windows 50 that each of the images has the full resolution of the devices 41 and 42.

In order to extend the region throughout which the autostereoscopic 3D image may be viewed, observer tracking arrangements, for instance of the type disclosed in GB 2 296 099, GB 2 296 151 and EP 0 721 132 may be provided. Such systems determine the position of an observer and control the relative positions of the light sources 76 and the window generation optic 77 such that the viewing windows 78 follow the positions of the eyes of the observer. For Instance, the light sources 76 may be moved laterally with respect to the optical axis of the display so that the viewing windows 78 laterally track the eyes of the observer.

It is thus possible to provide displays for 3D viewing which have a single optical path requiring fewer optical elements and allowing a more compact layout to be provided. One of the active elements, namely the polarisation modulator 42, is simpler and cheaper than a second amplitude modulator. Relatively expensive beam combining elements which can give rise to colour and intensity mismatching between the stereoscopic images are eliminated and automatic and exact alignment between the two stereoscopic views is achieved. Two full resolution full colour views can be provided In the 3D mode of operation and, when used partially or fully In the 2D mode, a full resolution full colour image can be provided. The displays can provide a mixture of such images simultaneously with areas of 3D information reconfigurable at will.

Standard video rate devices may be used because the displays may be operated at the standard video frame rate. The two active devices 41 and 42 may be embodied using standard commercial components with little or no modification and are therefore inexpensive to manufacture. In particular, the devices are compatible with LCD technology, The optical efficiency is equal to that of the more efficient known displays described hereinbefore.

What is claimed is:

1. A display comprising:
    a pixellated display device; and
    a pixellated polarisation modulator, each of whose pixels is optically aligned with a respective pixel of the display device and is controlled to vary the polarisation of output light from the respective pixel.

2. A display as claimed in claim 1, wherein the polarisation modulator comprises a variable polarisation rotator, each of whose pixels is controllable so as to vary an output linear polarisation angle over a range of at least substantially 90°.

3. A display as claimed in claim 1, wherein the polarisation modulator comprises a variable polarisation retarder, each of whose pixels is controllable so as to vary the retardence over a range of at least substantially 180° phase delay between fast and slow optical axes.

4. A display as claimed in claim 1, wherein the polarisation modulator comprises a pixellated time sequential polarisation switcher, each of whose pixels is switchable between a first state for providing a first output polarisation and a second state for providing a second output polarisation substantially perpendicular to the first polarisation.

5. A display as claimed in claim 1, wherein the polarisation modulator comprises a first liquid crystal device.

6. A display as claimed in claim 5, wherein the first liquid crystal device comprises a first liquid crystal layer and at least one pixellated electrode.

7. A display as claimed in claim 2, wherein the polarisation modulator comprises a first liquid crystal device including a first liquid crystal layer and at least one pixellated electrode, and
    wherein the first liquid crystal layer comprises a twisted nematic liquid crystal.

8. A display as claimed in claim 4, wherein the polarisation modulator comprises a first liquid crystal device including a first liquid crystal layer and at least one pixellated electrode, and
    wherein the first liquid crystal layer comprises a ferroelectric liquid crystal.

9. A display as claimed in claim 3, wherein the polarisation modulator comprises a first liquid crystal device including a first liquid crystal layer and at least one pixellated electrode, and wherein the first liquid crystal device comprises a pi-cell.

10. A display as claimed in claim 2, wherein the polarisation modulator comprises a first liquid crystal device including a first liquid crystal layer and at least one pixellated electrode, and wherein the first liquid crystal device comprises a pi-cell and an output quarter waveplate.

11. A display as claimed in claim 1, wherein a first microlens array is disposed on an input side of the polarisation modulator, and comprises a plurality of microlenses, and wherein each of which is optically aligned with a respective pixel of the polarisation modulators.

12. A display as claimed in claim 1, wherein a first Fresnel lens is disposed on an input side of the polarisation modulator.

13. A display as claimed in claim 1, wherein a microlens array is disposed on an output side of the polarisation modulator and comprises a plurality of microlenses, and wherein each of which is optically aligned with a respective pixel of the polarisation modulator.

14. A display as claimed in claim 1, wherein a Fresnel lens is disposed on an output side of the polarisation modulator.

15. A display as claimed in claim 1, wherein a microlens array is disposed on an output side of the display device and comprises a plurality of microlenses, and wherein each of which is optically aligned with a respective pixel of the display device.

16. A display as claimed in claim 1, wherein a Fresnel lens is disposed on an output side of the display device.

17. A display device as claimed in claim 1, wherein a Fresnel lens is disposed on an input side of the display device.

18. A display as claimed in claim 1, wherein the display device comprises a pixellated spatial light modulator and a light source.

19. A display as claimed in claim 18, wherein a microlens array is disposed on an input side of the spatial light modulator and comprises a plurality of microlenses, and wherein each of which is optically aligned with a respective pixel of the spatial light modulator.

20. A display as claimed in claim 18, wherein the spatial light modulator comprises a liquid crystal device.

21. A display as claimed in claim 18, wherein the spatial light modulator comprises a deformable mirror array.

22. A display as claimed in claim 6, wherein the display device comprises a pixellated spatial light modulator and a light source, and wherein the spatial light modulator comprises a second liquid crystal device, and wherein the second liquid crystal device comprises a second liquid crystal layer and a polariser disposed between the first and second liquid crystal layers.

23. A display as claimed in claim 22, wherein the first liquid crystal layer is disposed between first and second substrates and the second liquid crystal layer is disposed between the second substrate and a third substrate.

24. A display as claimed in claim 22, the first and second liquid crystal layers are disposed between a pair of substrates.

25. A display as claimed in claim 1, wherein an optical system for imaging the display device on the polarisation modulator such that each pixel of the display device is imaged onto a respective pixel of the polarisation modulator.

26. A display as claimed in claim 1, wherein the display device comprises a light emitting device.

27. A display as claimed in claim 26, wherein the light emitting device comprises a cathode ray tube.

28. A display as claimed in claim 27, further comprising a fiber optic faceplate disposed at an output face of the cathode ray tube.

29. A display as claimed in claim 1, further comprising a polarisation preserving diffuser disposed at an output side of the polarisation modulator.

30. A display as claimed in claim 1, further comprising a projection optical system and a polarisation preserving screen disposed at an output side of the polarisation modulator.

31. A display as claimed in claim 1, further comprising a quarter waveplate disposed at an output side of the polarisation modulator.

32. A display as claimed in claim 1, further comprising a controller for controlling each pixel of the display device to produce a light amplitude of $\sqrt{(A_1^2+A_2^2)}$ and for controlling each pixel of the polarisation modulator to produce a polarisation angle of $\tan^{-1}(A_1/A_2)$, where $A_1$ and $A_2$ are the corresponding pixel amplitudes of first and second images to be displayed by the display with substantially orthogonal polarisations, respectively.

33. A display as claimed in claim 1, wherein the display device and polarisation modulator are operative to produce first and second images with substantially orthogonal polarisations for stereoscopic viewing, and further comprising a pair of viewing glasses having orthogonally polarised lenses.

34. A display as claimed in claim 1, wherein the display device and polarisation modulator are operative to produce first and second images with substantially different polarisations for stereoscopic viewing, and further comprising a pair of viewing glasses comprising first and second polarisers whose polarising directions are substantially parallel and first and second half waveplates whose optical axes are at plus and minus a predetermined angle with respect to the polarising directions.

35. A display as claimed in claim 34, in which the predetermined angle is substantially 22.5°.

36. A display as claimed in claim 1 for autostereoscopic viewing, further comprising: first and second orthogonally polarised light sources; the display device comprising a spatial light modulator; and the polarisation modulator being disposed between the light sources and the spatial light modulator.

37. A display as claimed in claim 1 for providing stereoscopic viewing comprising first and second images having corresponding first and second polarisations, further comprising a controller for controlling each pixel of the display device to produce a light amplitude based on a predefined combination of corresponding pixel amplitudes of the first and second images, and for controlling each corresponding optically aligned pixel of the polarisation modulator to produce a pixel polarisation angle based on a predefined relationship between the first and second polarisations.

* * * * *